US011082687B2

(12) United States Patent
Chen et al.

(10) Patent No.: US 11,082,687 B2
(45) Date of Patent: Aug. 3, 2021

(54) MOTION VECTOR PREDICTION FOR AFFINE MOTION MODELS IN VIDEO CODING

(71) Applicant: QUALCOMM Incorporated, San Diego, CA (US)

(72) Inventors: Yi-Wen Chen, San Diego, CA (US); Wei-Jung Chien, San Diego, CA (US); Li Zhang, San Diego, CA (US); Yu-Chen Sun, Bellevue, WA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/601,486

(22) Filed: Oct. 14, 2019

(65) Prior Publication Data

US 2020/0045310 A1 Feb. 6, 2020

Related U.S. Application Data

(63) Continuation of application No. 15/725,052, filed on Oct. 4, 2017, now Pat. No. 10,448,010.

(Continued)

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/139* (2014.11); *H04N 19/176* (2014.11); *H04N 19/52* (2014.11); *H04N 19/537* (2014.11)

(58) Field of Classification Search
CPC .. H04N 19/176; H04N 19/105; H04N 19/139; H04N 19/52; H04N 19/537
See application file for complete search history.

(56) References Cited

U.S. PATENT DOCUMENTS 6,285,804 B1 * 9/2001 Crinon .................. G06T 3/4069
348/699
6,404,815 B1 6/2002 Sekiguchi et al.
(Continued)

FOREIGN PATENT DOCUMENTS

JP 2018511997 A 4/2018
KR 20060107864 A 10/2006
(Continued)

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
(Continued)

*Primary Examiner* — Neil R Mikeska
(74) *Attorney, Agent, or Firm* — Qualcomm Incorporated

(57) ABSTRACT

A video decoder selects a source affine block. The source affine block is an affine-coded block that spatially neighbors a current block. Additionally, the video decoder extrapolates motion vectors of control points of the source affine block to determine motion vector predictors for control points of the current block. The video decoder inserts, into an affine motion vector predictor (MVP) set candidate list, an affine MVP set that includes the motion vector predictors for the control points of the current block. The video decoder also determines, based on an index signaled in a bitstream, a
(Continued)

selected affine MVP set in the affine MVP set candidate list. The video decoder obtains, from the bitstream, motion vector differences (MVDs) that indicate differences between motion vectors of the control points of the current block and motion vector predictors in the selected affine MVP set.

19 Claims, 21 Drawing Sheets

Related U.S. Application Data

(60) Provisional application No. 62/404,719, filed on Oct. 5, 2016.

(51) Int. Cl.
 *H04N 19/139* (2014.01)
 *H04N 19/52* (2014.01)
 *H04N 19/537* (2014.01)

(56) References Cited

U.S. PATENT DOCUMENTS

| | | | |
|---|---|---|---|
| 6,711,209 B1 | 3/2004 | Lainema et al. | |
| 6,711,211 B1 | 3/2004 | Lainema et al. | |
| 6,738,423 B1 | 5/2004 | Lainema et al. | |
| 6,990,248 B2* | 1/2006 | Pardas | G06T 9/001 |
| | | | 345/419 |
| 9,282,338 B2 | 3/2016 | Zheng et al. | |
| 9,736,498 B2 | 8/2017 | Lin et al. | |
| 10,448,010 B2 | 10/2019 | Chen et al. | |
| 2002/0034250 A1 | 3/2002 | Yoo et al. | |
| 2002/0057741 A1* | 5/2002 | Lainema | H04N 19/147 |
| | | | 375/240.16 |
| 2004/0146107 A1* | 7/2004 | Sekiguchi | H04N 19/463 |
| | | | 375/240.14 |
| 2006/0067585 A1 | 3/2006 | Pace et al. | |
| 2007/0297513 A1* | 12/2007 | Biswas | H04N 7/014 |
| | | | 375/240.16 |
| 2012/0177120 A1 | 7/2012 | Guo et al. | |
| 2013/0039426 A1* | 2/2013 | Helle | H04N 19/30 |
| | | | 375/240.16 |
| 2013/0128974 A1 | 5/2013 | Chien et al. | |
| 2013/0287116 A1 | 10/2013 | Helle et al. | |
| 2014/0362911 A1 | 12/2014 | Puri | |
| 2015/0256755 A1* | 9/2015 | Wu | G06T 7/277 |
| | | | 348/208.6 |
| 2017/0013279 A1* | 1/2017 | Puri | H04N 19/527 |
| 2017/0054996 A1 | 2/2017 | Xu et al. | |
| 2017/0085917 A1 | 3/2017 | Hannuksela et al. | |
| 2017/0195685 A1 | 7/2017 | Chen et al. | |
| 2017/0214932 A1 | 7/2017 | Huang | |
| 2017/0332095 A1 | 11/2017 | Zou et al. | |
| 2017/0339425 A1 | 11/2017 | Jeong et al. | |
| 2018/0098063 A1 | 4/2018 | Chen et al. | |
| 2018/0220149 A1* | 8/2018 | Son | H04N 19/176 |
| 2018/0234697 A1* | 8/2018 | Jang | H04N 19/124 |
| 2018/0309990 A1 | 10/2018 | Alshina et al. | |
| 2018/0352247 A1 | 12/2018 | Park et al. | |
| 2019/0098312 A1 | 3/2019 | Chen et al. | |

FOREIGN PATENT DOCUMENTS

| | | |
|---|---|---|
| RU | 2011102033 A | 7/2012 |
| WO | 2011013253 A1 | 2/2011 |
| WO | 2012099438 A2 | 7/2012 |
| WO | 2017087751 A1 | 5/2017 |
| WO | 2017130696 A1 | 8/2017 |
| WO | 2017200771 A1 | 11/2017 |

OTHER PUBLICATIONS

Chapter II Demand and Response to Written Opinion from International Application No. PCT/US2017/055350, dated Jul. 16, 2018, 38 pp.
Chen., et al., "Algorithm description of Joint Exploration Test Model 2," Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B1001, Mar. 25, 2016, 32 pages.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG-16 ); URL: http://phenix.int-evry.fr/jvet/,, No. JVET-A1001 Feb. 24, 2016 (Feb. 24, 2016), XP030150000, 27 pages.
Chen J., et al., Algorithm Description of Joint Exploration Test Model 2 Joint Video Exploration Team (JVET) of ITU-T SG 16 WP 3 and ISO/IEC JTC 1/SC 29/WG 11, 2nd Meeting: San Diego, Feb. 20-26, 2016, JVET-B1001-v3, 32 Pages.
Chen J., et al., "Algorithm Description of Joint Exploration Test Model 4," Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pp.
Chen J., et al., "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2,44 Pages.
Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pages.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Flynn D., et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11), 16th Meeting: San Jose, US, Jan. 9-17, 2014, Document: JCTVC-P1005_v1, 368 pages.
He Y., et al., "Efficient coding with adaptive motion models", 23. Picture Coding Symposium; Apr. 23, 2003-Apr. 25, 2003; Saint Malo, Apr. 23, 2003 (Apr. 23, 2003), XP030080026, 5 pages.
Huawei Technologies: "Affine Transform Prediction for Next Generation Video Coding," ITU-T SG16 Meeting; Oct. 12-23, 2015; Geneva, No. T13-SG16-C-1016, Sep. 29, 2015, XP030100743, 11 pages.
International Preliminary Report on Patentability—PCT/US2017/055350, The International Bureau of WIPO—Geneva, Switzerland, dated Oct. 26, 2018.
International Search Report and Written Opinion—PCT/US2017/055350—ISA/EPO—dated Feb. 13, 2018.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.261, Line Transmission of Non-Telephone Signals, Video Codec for Audiovisual Services at p x 64 kbits, The International Telecommunication Union, Mar. 1993, 29 pp.
ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

(56) References Cited

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Li L., et al., "An Efficient Four-Parameter Affine Motion Model for Video Coding," Cornell University Library, 201 Olin Library Cornell University Ithaca, NY 14853, Feb. 21, 2017, XP080747890, 14 pages.
Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017, No. JVET-H1002, Oct. 23, 2017, 27 pp.
Prosecution History for U.S. Appl. No. 15/725,052 dated from Feb. 25, 2019 through Jun. 7, 2019, 42 pages.
Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP055388661, USA ISSN: 1051-8215, DOI: 10.1109/TCSVT.2012.2221191, pp. 1649-1668, p. 1662, Paragraph 3) Merge Mode.
U.S. Appl. No. 16/155,744, filed Oct. 9, 2018.
U.S. Appl. No. 62/570,417, filed by Kai Zhang, et al., filed on Oct. 10, 2017.
Wang Y., et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/WG11 and ITU-T SG.16); No. JCTVC-O1003_v2; Nov. 24, 2013; 311 pp.
Wang Y., et al., "High Efficiency Video Coding (HEVC) Defect Report 2", Joint Collaborative Team on Video Coding (JCT-VC) of ITU-T SG 16 WP 3 and ISO/IEC JTC 1/SC 29/WG 11, 15th Meeting: Geneva, Oct. 23-Nov. 1, 2013, JCTV-O1002-v2, 311 pp.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Zou F., et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, No. JVET-O0062, May 17, 2016, XP030150163, 5 pages.
Zou F., et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, No. JVET-C0062-v2, Apr. 4, 2017, 5 pp.
Zou F., et al.,"EE4: Improved affine motion prediction", 4th JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/,, No. JVET-D0121, Oct. 6, 2016, XP030150372, 4 pages.
Boyce J., et al., "JVET Common Test Conditions and Software Reference Configurations", Joint Video Experts Team (JVET) of ITU-T SG 16 WP 3 and ISO/IEC JTC 1/SC 29/WG 11, JVET-J1010-v1, Apr. 10-20, 2018, 4 pages.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Chen J., et al., JVET-G1001-V1 "Algorithm Description of Joint Exploration Test Model 7 (JEM7)", Joint Video Exploration Team (JVET) of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Han Y., et al., "CE4.1.3: Affine Motion Compensation Prediction", Joint Video Exploration Team (JVET) of ITU-T SG 16 WP 3 and ISO/IEC JTC 1/SC 29/WG 11, 11th Meeting: Ljubljana, SI, Jul. 10-18, 2018, JVET-K0337, 6 pages.
Yang H., et al., "Description of CE4: Inter Prediction and Motion Vector Coding", Joint Video Experts Team (JVET) of ITU-T SG 16 WP 3 and ISO/IEC JTC 1/SC 29/WG 11, JVET-J1024r2, 10th Meeting: San Diego, US, Apr. 10-20, 2018, 46 pages.
Taiwan Search Report—TW106134362—TIPO—dated Feb. 7, 2020.

* cited by examiner

| index | Affine MVP set |
|---|---|
| 0 | $\{V'_i, V'_j\}$ ← 902 |
| 1 | $\{V_i, V_j\}$ |
| 2 | : |
| 3 | : |
| 4 | |
| 5 | |
| 6 | |
| 7 | $\{AMVP_0, AMVP_0\}$ |
| 8 | $\{AMVP_1, AMVP_1\}$ |

Size=2 (rows 0-1)

900

Sorted ↓

| index | Affine MVP set | |
|---|---|---|
| 0 | $\{V_i, V_j\}$ | $V_i \in \{V_A, V_B, V_C\}$ |
| 1 | : | $V_j \in \{V_D, V_E\}$ |
| 2 | : | |
| 3 | : | |
| 4 | | |
| 5 | $\{AMVP_0, AMVP_0+Offset_0\}$ | |
| 6 | $\{AMVP_1, AMVP_1+Offset_1\}$ | |
| 7 | | |

FIG. 11A

| index | Affine MVP set | |
|---|---|---|
| 0 | $\{V_i, V_j, V_k\}$ | $V_i \in \{V_A, V_B, V_C\}$ |
| 1 | : | $V_j \in \{V_D, V_E\}$ |
| 2 | : | $V_k \in \{V_F, V_G\}$ |
| 3 | : | |
| : | | |
| 11 | | |
| 12 | $\{AMVP_0, AMVP_0, AMVP_0+Offset_0\}$ | |
| 13 | $\{AMVP_1, AMVP_1, AMVP_1+Offset_1\}$ | |

FIG. 11B

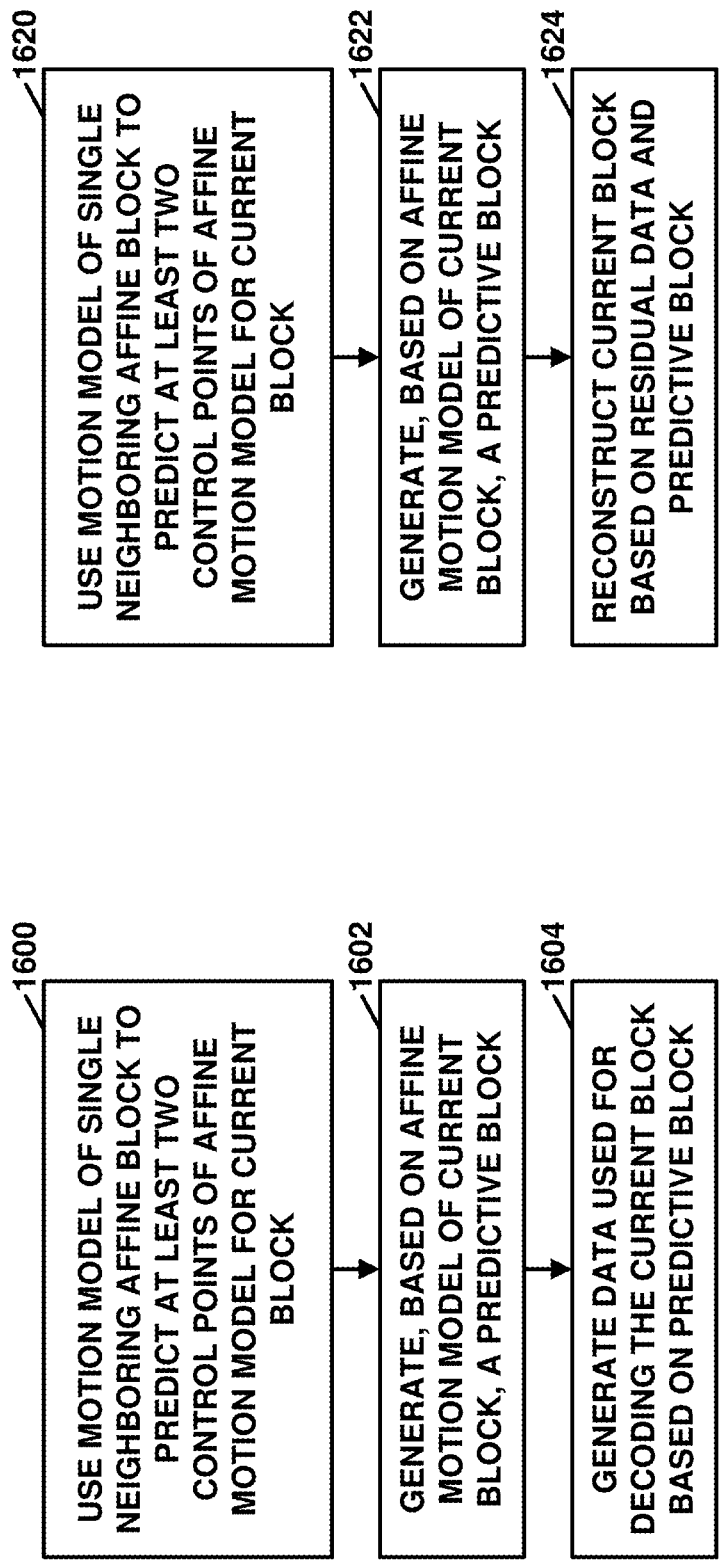

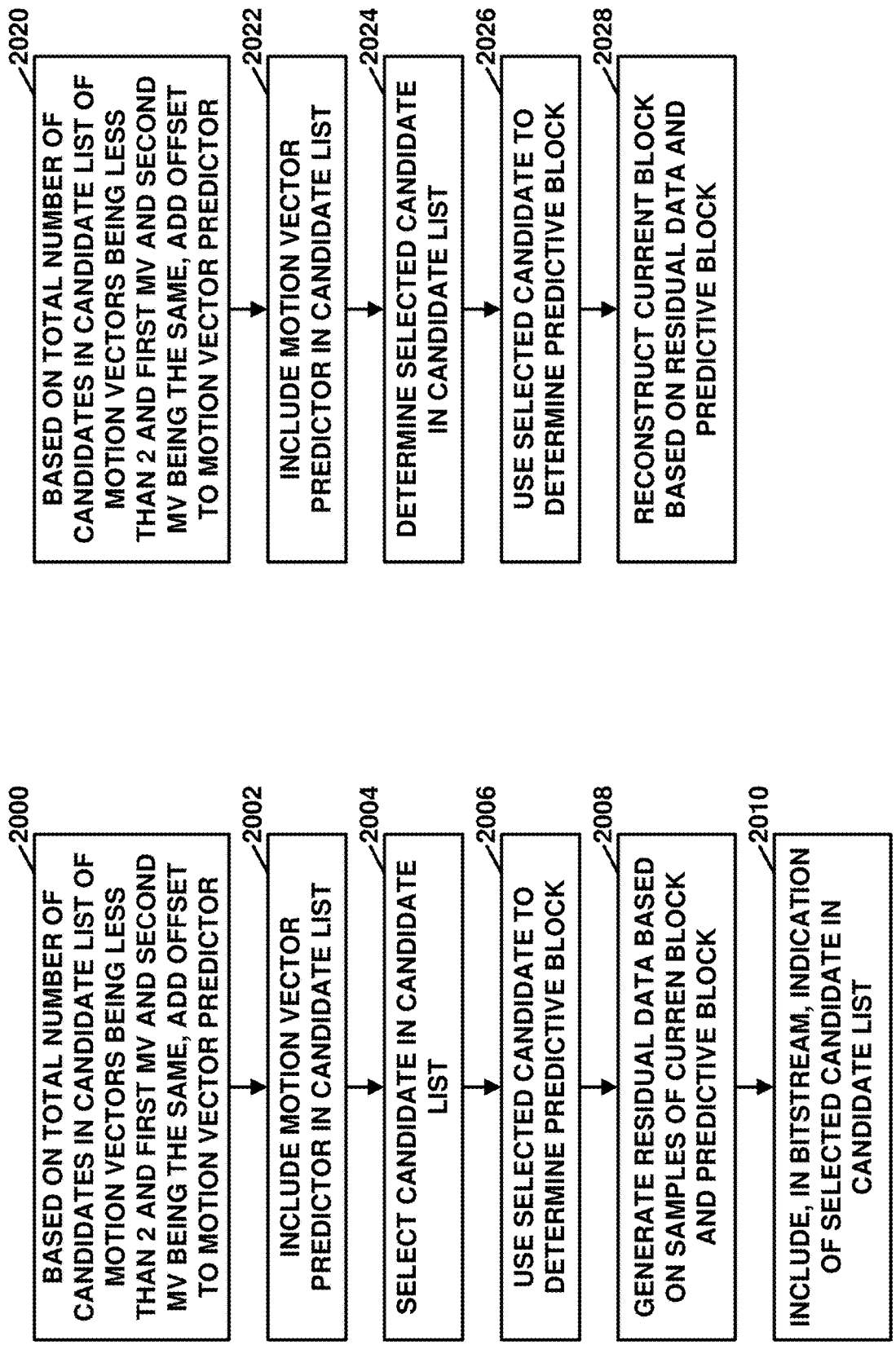

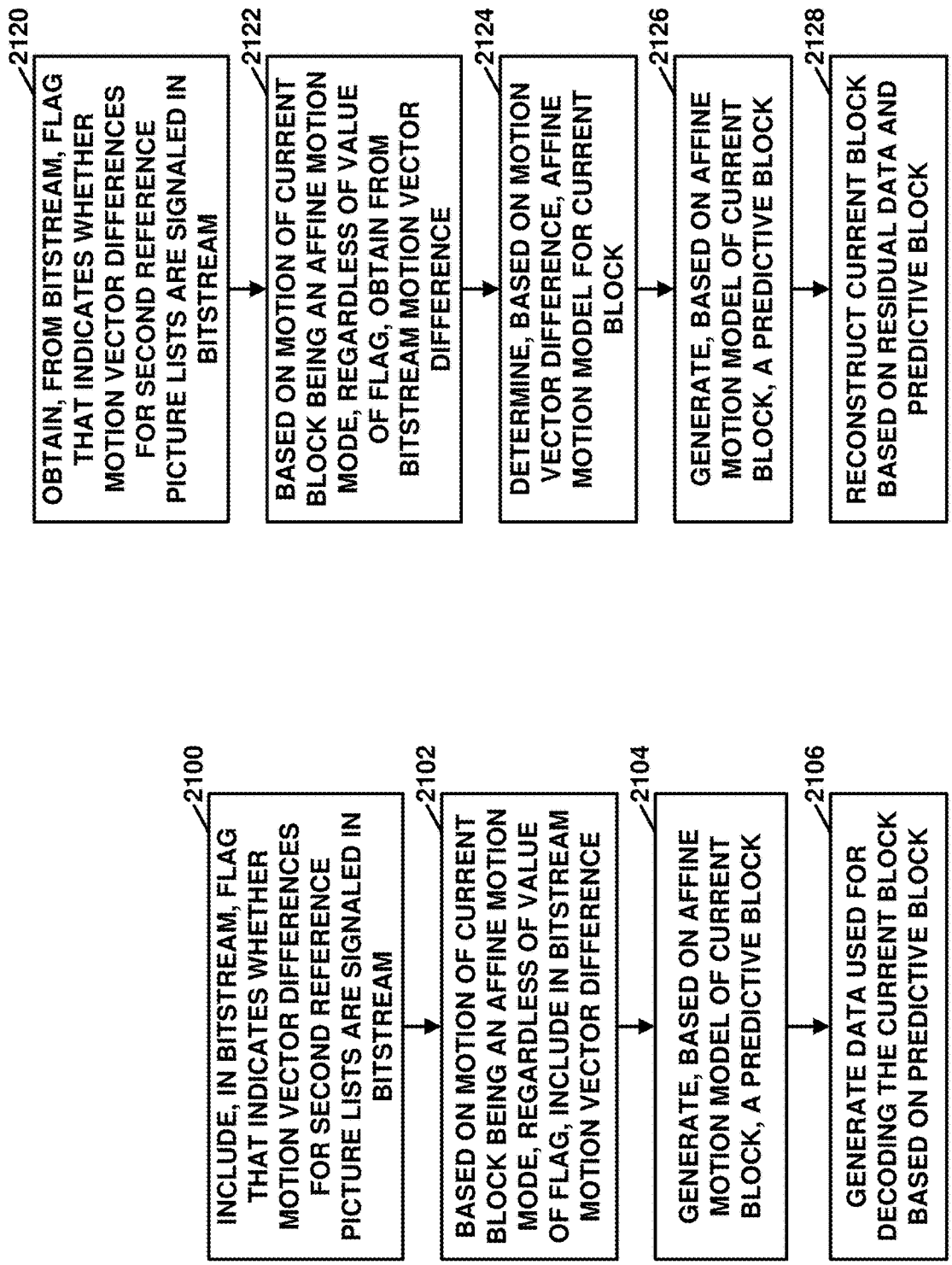

US 11,082,687 B2

MOTION VECTOR PREDICTION FOR AFFINE MOTION MODELS IN VIDEO CODING

This application is a continuation of U.S. patent application Ser. No. 15/725,052, filed Oct. 4, 2017, which claims the benefit of U.S. Provisional Patent Application 62/404,719, filed Oct. 5, 2016, the entire contents of which are incorporated herein by reference.

TECHNICAL FIELD

This disclosure relates to devices, systems, and methods for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to motion vector prediction and motion vector reconstruction for affine motion prediction mode. The techniques may be applied to any of the existing video codecs, such as HEVC (High Efficiency Video Coding) or may be an efficient coding tool in any future video coding standards.

In one example, this disclosure describes a method of decoding video data, the method comprising: selecting a source affine block, the source affine block being an affine-coded block that spatially neighbors a current block; extrapolating motion vectors of control points of the source affine block to determine motion vector predictors for control points of the current block; inserting, into an affine motion vector predictor (MVP) set candidate list, an affine MVP set that includes the motion vector predictors for the control points of the current block; determining, based on an index signaled in a bitstream, a selected affine MVP set in the affine MVP set candidate list; obtaining, from the bitstream, motion vector differences (MVDs) that indicate differences between motion vectors of the control points of the current block and motion vector predictors in the selected affine MVP set; and determining, based on the motion vector predictors included in the selected affine MVP set and the MVDs, motion vectors of the control points of the current block; generating, based on the motion vectors of the control points of the current block, a predictive block; and reconstructing the current block based on residual data and the predictive block.

In another example, this disclosure describes a method of encoding video data, the method comprising: selecting a source affine block, the source affine block being an affine-coded block that spatially neighbors a current block; extrapolating motion vectors of control points of the source affine block to determine motion vector predictors for control points of the current block; inserting, into an affine motion vector predictor (MVP) set candidate list, an affine MVP set that includes the motion vector predictors for the control points of the current block; selecting an affine MVP set in the affine MVP set candidate list; signaling, in a bitstream, motion vector differences (MVDs) that indicate differences between motion vectors of the control points of the current block and motion vector predictors in the selected affine MVP set; and signaling, in the bitstream, an index indicating a position in the affine MVP set candidate list of the selected affine MVP set.

In another example, this disclosure describes a device for decoding video data, the device comprising: a memory configured to store the video data; and one or more processing circuits configured to: select a source affine block, the source affine block being an affine-coded block that spatially neighbors a current block; extrapolate motion vectors of control points of the source affine block to determine motion vector predictors for control points of the current block; insert, into an affine motion vector predictor (MVP) set candidate list, an affine MVP set that includes the motion vector predictors for the control points of the current block; determine, based on an index signaled in a bitstream, a selected affine MVP set in the affine MVP set candidate list; obtain, from the bitstream, motion vector differences (MVDs) that indicate differences between motion vectors of the control points of the current block and motion vector predictors in the selected affine MVP set; and determine, based on the motion vector predictors included in the selected affine MVP set and the MVDs, motion vectors of the control points of the current block; generate, based on the motion vectors of the control points of the current block, a predictive block; and reconstruct the current block based on residual data and the predictive block.

In another example, this disclosure describes a device for encoding video data, the device comprising: a memory configured to store the video data; and one or more processing circuits configured to: select a source affine block, the source affine block being an affine-coded block that spatially neighbors a current block; extrapolate motion vectors of control points of the source affine block to determine motion vector predictors for control points of the current block; insert, into an affine motion vector predictor (MVP) set candidate list, an affine MVP set that includes the motion vector predictors for the control points of the current block; select an affine MVP set in the affine MVP set candidate list; signal, in a bitstream, motion vector differences (MVDs) that indicate differences between motion vectors of the control points of the current block and motion vector predictors in the selected affine MVP set; and signal, in the bitstream, an index indicating a position in the affine MVP set candidate list of the selected affine MVP set.

In another example, this disclosure describes a device for decoding video data, the device comprising: means for selecting a source affine block, the source affine block being an affine-coded block that spatially neighbors a current block; means for extrapolating motion vectors of control points of the source affine block to determine motion vector predictors for control points of the current block; means for inserting, into an affine motion vector predictor (MVP) set candidate list, an affine MVP set that includes the motion vector predictors for the control points of the current block; means for determining, based on an index signaled in a bitstream, a selected affine MVP set in the affine MVP set candidate list; means for obtaining, from the bitstream, motion vector differences (MVDs) that indicate differences between motion vectors of the control points of the current block and motion vector predictors in the selected affine MVP set; means for determining, based on the motion vector predictors included in the selected affine MVP set and the MVDs, motion vectors of the control points of the current block; means for generating, based on the motion vectors of the control points of the current block, a predictive block; and means for reconstructing the current block based on residual data and the predictive block.

In another example, this disclosure describes a device for encoding video data, the device comprising: means for selecting a source affine block, the source affine block being an affine-coded block that spatially neighbors a current block; means for extrapolating motion vectors of control points of the source affine block to determine motion vector predictors for control points of the current block; means for inserting, into an affine motion vector predictor (MVP) set candidate list, an affine MVP set that includes the motion vector predictors for the control points of the current block; means for selecting an affine MVP set in the affine MVP set candidate list; means for signaling, in a bitstream, motion vector differences (MVDs) that indicate differences between motion vectors of the control points of the current block and motion vector predictors in the selected affine MVP set; and means for signaling, in the bitstream, an index indicating a position in the affine MVP set candidate list of the selected affine MVP set.

In another example, this disclosure describes a computer-readable storage medium storing instructions that, when executed, cause one or more processing circuits of a device for video decoding to: select a source affine block, the source affine block being an affine-coded block that spatially neighbors a current block; extrapolate motion vectors of control points of the source affine block to determine motion vector predictors for control points of the current block; insert, into an affine motion vector predictor (MVP) set candidate list, an affine MVP set that includes the motion vector predictors for the control points of the current block; determine, based on an index signaled in a bitstream, a selected affine MVP set in the affine MVP set candidate list; obtain, from the bitstream, motion vector differences (MVDs) that indicate differences between motion vectors of the control points of the current block and motion vector predictors in the selected affine MVP set; determine, based on the motion vector predictors included in the selected affine MVP set and the MVDs, motion vectors of the control points of the current block; generate, based on the motion vectors of the control points of the current block, a predictive block; and reconstruct the current block based on residual data and the predictive block.

In another example, this disclosure describes a computer-readable storage medium storing instructions that, when executed, cause one or more processing circuits of a device for encoding video data to: select a source affine block, the source affine block being an affine-coded block that spatially neighbors a current block; extrapolate motion vectors of control points of the source affine block to determine motion vector predictors for control points of the current block; insert, into an affine motion vector predictor (MVP) set candidate list, an affine MVP set that includes the motion vector predictors for the control points of the current block; select an affine MVP set in the affine MVP set candidate list; signal, in a bitstream, motion vector differences (MVDs) that indicate differences between motion vectors of the control points of the current block and motion vector predictors in the selected affine MVP set; and signal, in the bitstream, an index indicating a position in the affine MVP set candidate list of the selected affine MVP set.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 9 illustrates an example affine MVP set candidate list that includes an extrapolated MVP set, in accordance with a technique of this disclosure.

FIG. 11A illustrates an example affine MVP set candidate list for a 4-parameter affine motion model, in accordance with a technique of this disclosure.

FIG. 11B illustrates an example affine MVP set candidate list for a 6-parameter affine motion model, in accordance with a technique of this disclosure.

FIG. 16A is a flowchart illustrating an example operation for encoding video data, in accordance with a technique of this disclosure.

FIG. 16B is a flowchart illustrating an example operation for decoding video data, in accordance with a technique of this disclosure.

FIG. 20A is a flowchart illustrating an example operation for encoding video data, in accordance with a technique of this disclosure.

FIG. 20B is a flowchart illustrating an example operation for decoding video data, in accordance with a technique of this disclosure.

FIG. 21A is a flowchart illustrating an example operation for encoding video data, in accordance with a technique of this disclosure.

FIG. 21B is a flowchart illustrating an example operation for decoding video data, in accordance with a technique of this disclosure.

DETAILED DESCRIPTION

Figure 1:
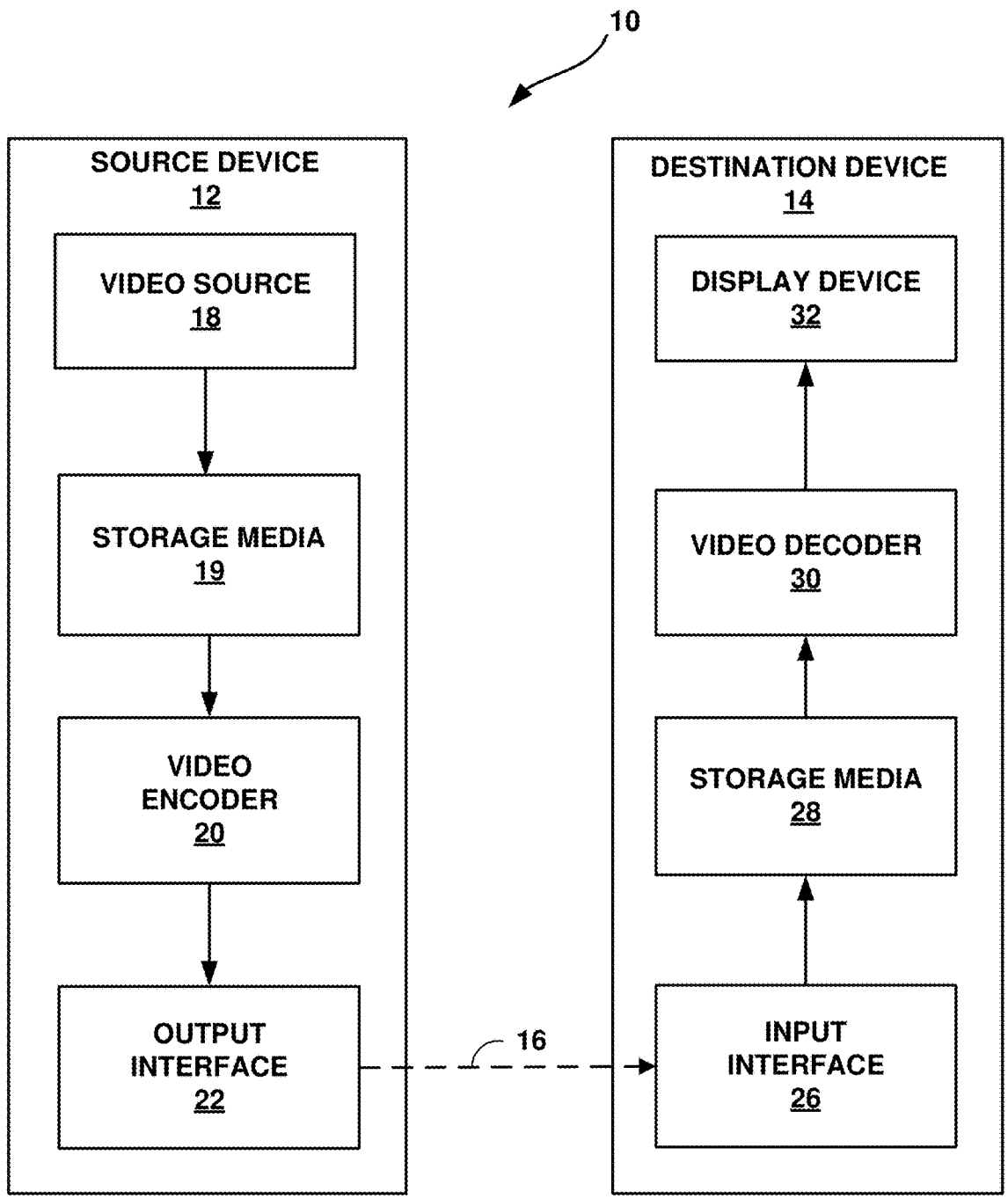
FIG. 1 is a block diagram illustrating an example video encoding and decoding system that may utilize one or more techniques described in this disclosure.

The use of affine motion models has been proposed to provide further compression of video data. An affine motion model for a block expresses rotation of the block in a series of pictures. An affine motion model of a block can be determined based on motion vectors of control points of the block. In some implementations, the control points of the block are the top-left and top-right corners of the block. In some implementations, the control points of the block further include the bottom-left corner of the block. A video coder (i.e., a video encoder or a video decoder) may calculate motion vectors of sub-blocks of the block based on the motion vectors of the control points of the block.

Two primary techniques have been proposed for signaling the motion vectors of the control points of a block. The first technique is the affine inter mode. The second technique is the affine merge mode. In the affine inter mode, a video encoder generates an affine motion vector predictor (MVP) set candidate list for a current block. The affine MVP set candidate list is a list of affine MVP sets. Each affine MVP set is a set of MVPs corresponding to different control points of the current block. The video encoder signals an index that identifies to a video decoder a selected affine MVP set in the affine MVP set candidate list. Additionally, the video encoder signals a motion vector difference (MVD) for each of the control points of the current block. The motion vector of a control point may be equal to the MVD for the control point plus the motion vector predictor for control point in the selected affine MVP set. The video encoder also signals a reference index that identifies a reference picture which the video decoder is use with the current block. The video decoder generates the same affine MVP set candidate list and uses the signaled index to determine the selected affine MVP set. The video decoder may add the MVDs to motion vectors of the selected affine MVP set to determine the motion vector of the control points of the current block.

In the affine merge mode, a video encoder and a video decoder identify the same affine source block for a current block. The affine source block may be an affine-coded block that spatially neighbors the current block. The video encoder and video decoder extrapolate the motion vectors of the control points of the current block from the motion vectors of the control points of the affine source block. For instance, the video encoder and the video decoder may construct an affine motion model that describes motion vectors of locations within the current block. The affine motion model is defined by a set of affine parameters. The video encoder and the video decoder may determine the affine parameters based on the motion vectors of the control points of the current block. The video encoder and the video decoder may determine the motion vectors of the control points of the current block based on motion vectors of control points of the affine source block.

In accordance with one example technique of this disclosure, when generating an affine MVP set candidate list in the affine inter mode, a video encoder may include, in the affine MVP set candidate list for a current block, an affine MVP set that specifies extrapolated motion vectors of the control points of an affine source block. In this example, the video encoder may signal an index into the affine MVP set candidate list, MVDs for each control point of the current block, and a reference index. A video decoder may generate the same affine MVP set candidate list for the current block. Additionally, the video decoder uses the index into the affine MVP set candidate list to identify a selected affine MVP candidate set. The video decoder may then use the MVDs and motion vector predictors of the selected affine MVP candidate set to determine motion vectors of the control points of the current block. Furthermore, the video decoder may use the motion vectors and the reference picture indicated by the reference index to generate a predictive block for the current block. The video decoder may use the predictive block for the current block to reconstruct the current block. Inclusion of the affine MVP set specifying extrapolated motion vectors of the control points of the affine source block in the affine MVP set candidate list of the current block may increase coding efficiency.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, wired transmissions, satellite television transmissions, Internet streaming video transmissions, such as dynamic adaptive streaming over HTTP (DASH), digital video that is encoded onto a data storage medium, decoding of digital video stored on a data storage medium, or other applications or combinations of the above examples. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). An HEVC draft specification, and referred to as HEVC WD hereinafter, is available from Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting, Vienna, AT, 25 Jul.-2 Aug. 2013, document JCTVC-N1003_v1, available from http://phenix.int-evry.fr/jct/doc_end_user/documents/14_Vienna/wg11/JCTVC-N1003-v1.zip. HEVC is also published as Recommendation ITU-T H.265, Series H: Audiovisual and Multimedia Systems, Infrastructure of audiovisual services—Coding of moving video, High efficiency video coding, December 2016.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of reference software, i.e., Joint Exploration Model 3 (JEM 3) could be downloaded from: https://jvet.hhi.fraunhofer.de/svn/svn_HMJEMSoftware/tags/HM- 16.6-JEM-3.0/. J. Chen, E. Alshina, G. J. Sullivan, J.-R. Ohm, J. Boyce, "Algorithm Description of Joint Exploration Test Model 3", JVET-C1001, May 2016 (hereinafter, "JVET-C1001") includes an algorithm description of Joint Exploration Test Model 3 (JEM3.0).

In HEVC and other video coding specifications, video data includes a series of pictures. Pictures may also be referred to as "frames." A picture may include one or more sample arrays. Each respective sample array of a picture may comprise an array of samples for a respective color component. In HEVC, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

In HEVC and particular other codecs, video encoder 20 encodes a CU using only one prediction mode (i.e., intra prediction or inter prediction). Thus, in HEVC and particular other codecs, video encoder 20 may generate predictive blocks of a CU using intra prediction or video encoder 20 may generate predictive blocks of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partition modes for a CU coded with inter prediction mode, i.e., PART_2N×2N, PART_2N× N, PART_N×2N, PART_N×N, PART_2N×nU, PART_2N× nD, PART_nL×2N and PART_nR×2N. When a CU is intra predicted, 2N×2N and N×N are the only permissible PU shapes, and within each PU a single intra prediction mode is coded (while chroma prediction mode is signalled at CU level).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture. A slice segment header is a part of a coded slice segment containing the data elements pertaining to the first or all coding tree units represented in the slice segment. The term "slice header" applies to a slice segment header of the independent slice segment that is a current slice segment or the most recent independent slice segment that precedes a current dependent slice segment in decoding order.

As briefly mentioned above, in HEVC, the largest coding unit in a slice is called a coding tree block (CTB) or coding tree unit (CTU). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, the CU may be further partitioned into 2 or 4 prediction units (PUs) or become just one PU when further partition does not apply. When two PUs are present in one CU, the PUs can be half size rectangles or two rectangle size with ¼ or ¾ size of the CU. When the CU is inter coded, one set of motion information is present for each PU. In addition, each PU is coded with a unique inter-prediction mode to derive the set of motion information. In some video coding standards, there a CU is not divided into multiple PUs. Hence, in such video coding standards, there is no distinction between a PU and a CU. Therefore, when techniques of this disclosure are applied in such standards, discussion of PUs may be applicable to CUs.

A video coder may perform uni-directional inter prediction or bi-directional inter prediction for a current block (e.g., a CU or PU). When performing uni-directional inter prediction for the current block, the video coder uses a motion vector to determine a location in a reference picture. The video coder may then generate a predictive block for the current block. The predictive block may comprise a block of samples in the reference picture at the location indicated by the motion vector, or a block of samples interpolated from samples of the reference picture. When performing bi-directional inter prediction, the video coder may perform this process with a second reference picture and a second motion vector, thereby generating a second predictive block for the current block. In bi-directional inter prediction, the predictive blocks generated from single reference pictures may be referred to herein as preliminary predictive blocks. Furthermore, in bi-directional inter prediction, the video coder may generate, based on the two preliminary blocks, a final predictive block for the current block. In some examples, the video coder may generate the final predictive block such that each sample in the final predictive block is a weighted average of corresponding samples in the preliminary predictive blocks.

To support inter prediction in a picture, a video coder generates two reference picture lists for the picture. The picture's reference picture lists include reference pictures that are available for use in performing inter prediction of blocks in the picture. The two reference picture lists are commonly referred to as List 0 and List 1. In one example, each reference picture in the picture's List 0 occurs prior to the picture in output order. In this example, each reference picture in the picture's List 1 occurs after the picture in output order. Hence, use of a reference picture in List 0 may be considered a first inter prediction direction and use of a reference picture in List 1 may be considered a second inter prediction direction. Video encoder 20 and video decoder 30 generate the picture's List 0 with reference pictures in the same order. Likewise, video encoder 20 and video decoder 30 generate the picture's List 1 with reference pictures in the same order. Thus, video encoder 20 may indicate to video decoder 30 a reference picture in a reference picture list by signaling a reference index that indicates a location in the reference picture list of the reference picture.

The HEVC standard provides multiple inter prediction modes, including merge mode and advanced motion vector prediction (AMVP) mode. In merge mode, video encoder 20 and video decoder 30 generate matching merge motion vector (MV) candidate lists for a PU. The merge MV candidate list for the PU includes one or more merge candidates, which may also be referred to as motion vector predictors (MVPs). In HEVC, the merge MV candidate list contains up to 5 merge candidates. Each respective merge candidate in the merge MV candidate list specifies one or more motion vector(s) and one or more reference index(es). For example, a merge candidate may specify a List 0 motion vector and/or a List 1 motion vector, and may specify a List 0 reference index and/or a List 1 reference index. A List 0 motion vector is a motion vector that indicates a location in a reference picture in List 0. A List 1 motion vector is a motion vector that indicates a location in a reference picture in List 1. Video encoder 20 may signal a merge index that indicates a location in the merge MV candidate list of a selected merge candidate for the PU. Video decoder 30 may use the merge index to identify the selected merge candidate. Video decoder 30 may then use the motion vectors and reference indexes of the selected merge candidate as the motion vectors and reference indexes of the PU.

In AMVP mode, video encoder 20 generates a List 0 AMVP candidate list and/or a List 1 AMVP candidate list for a PU, either of which may be referred to as an AMVP candidate list. Video decoder 30 generates AMVP candidate lists matching the AMVP candidate lists generated by video encoder 20. In HEVC, an AMVP candidate list contains two AMVP candidates. Each respective AMVP candidate in a List 0 AMVP candidate list specifies a respective List 0 motion vector. Each respective AMVP candidate in a List 1 AMVP candidate list specifies a respective List 1 motion vector. In the AMVP mode, if the PU is uni-directionally inter predicted from List 0 or bi-directionally inter predicted, video encoder 20 signals a List 0 MVP index, a List 0 reference index, and a List 0 motion vector difference (MVD). The List 0 MVP index specifies a location of a selected AMVP candidate in the List 0 AMVP candidate list. The List 0 reference index specifies a location of a selected List 0 reference picture. The List 0 MVD specifies a difference between a List 0 motion vector of the PU and the List 0 motion vector specified by the selected AMVP candidate in the List 0 AMVP candidate list. Accordingly, video decoder 30 may use the List 0 MVP index and the List 0 MVD to determine the List 0 motion vector of the PU. Video decoder 30 may then determine a preliminary or final predictive block for the PU comprising samples corresponding to a location in the selected List 0 reference picture identified by the List 0 motion vector of the PU. Video encoder 20 may signal similar syntax elements for List 1 and video decoder 30 may use the syntax elements for List 1 in a similar way.

As can be seen above, a merge candidate corresponds to a full set of motion information while an AMVP candidate contains just one motion vector for a specific prediction direction. The candidates for both merge mode and AMVP mode may be derived similarly from the same spatial and temporal neighboring blocks.

Figure 2A:
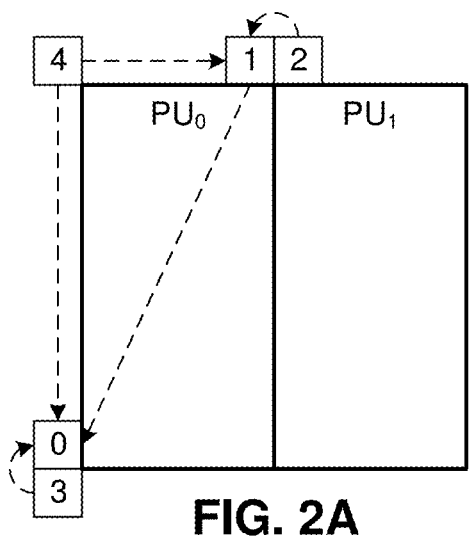
FIG. 2A illustrates spatial neighboring motion vector (MV) candidates for merge mode.
Figure 2B:
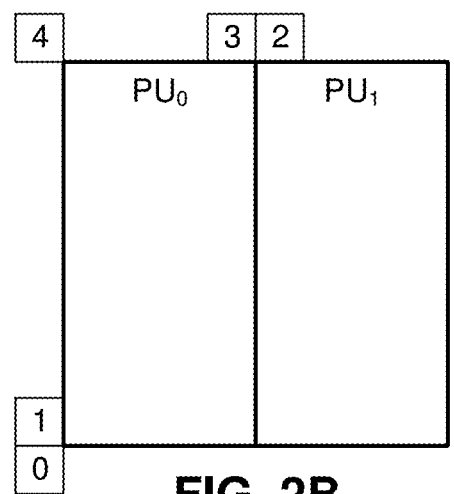
FIG. 2B illustrates spatial neighboring MV candidates for Advanced Motion Vector Prediction (AMVP) mode.

Spatial MV candidates are derived from the neighboring blocks shown in FIG. 2A and FIG. 2B, for a specific PU ($PU_0$), although the methods generating the candidates from the blocks differ for merge and AMVP modes. FIG. 2A illustrates spatial neighboring MV candidates for merge mode. In merge mode, up to four spatial MV candidates can be derived with the order shown in FIG. 2A with numbers, and the order is the following: left (0), above (1), above right (2), below left (3), and above left (4).

FIG. 2B illustrates spatial neighboring MV candidates for AMVP mode. In AMVP mode, the neighboring blocks are divided into two groups: a left group consisting of the block 0 and 1, and an above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. For example, as part of generating a List 0 AMVP candidate list, the video coder checks whether block 0 is predicted from List 0 and, if so, whether a List 0 reference picture of block 0 is the same as the current PU's List 0 reference picture. If block 0 is predicted from List 0 and the block 0's List 0 reference picture is the same as the current PU's List 0 reference picture, the video coder includes block 0's List 0 motion vector in the List 0 AMVP candidate list. If not, the video coder checks whether block 0 is predicted from List 1 and, if so, whether block 0's List 1 reference picture is the same as the current PU's List 0 reference picture. If block 0 is predicted from List 0 and block 0's List 1 reference picture is the same as the current PU's List 0 reference picture, the video coder includes block 0's List 1 motion vector in the List 0 AMVP candidate list. If block 0's List 1 reference picture is not the same as the current PU's List 0 reference picture, the video coder repeats this process with block 1 instead of block 0.

However, if block 1 is not predicted from List 1 or block 1's List 1 reference picture is not the same as the current PU's List 0 reference picture, the video coder determines whether block 0 is predicted from List 0 and, if so, determines whether block 0's List 0 reference picture and the current PU's List 0 reference picture are both long-term reference pictures or both short-term reference pictures. If block 0's List 0 reference picture and the current PU's List 0 reference picture are both long-term reference pictures or block 0's List 0 reference picture and the current PU's List 0 reference picture are both short-term reference pictures, the video coder may scale block 0's List 0 motion vector based on a temporal difference between block 0's List 0 reference picture and the current PU's List 0 reference picture. The video coder includes the scaled List 0 motion vector into the List 0 AMVP candidate list. If block 0's List 0 reference picture is a long-term reference picture and the current PU's List 0 reference picture is a short-term reference picture, or vice versa, the video coder determines whether block 0 is predicted from List 1 and, if so, determines whether block 0's List 1 reference picture and the current PU's List 0 reference picture are both long-term reference pictures or both short-term reference pictures. If block 0's List 1 reference picture and the current PU's List 0 reference picture are both long-term reference pictures or block 0's List 1 reference picture and the current PU's List 0 reference picture are both short-term reference pictures, the video coder may scale block 0's List 1 motion vector based on a temporal difference between block 0's List 1 reference picture and the current PU's List 0 reference picture. The video coder includes the scaled List 0 motion vector into the List 0 AMVP candidate list. If block 0's List 1 reference picture is a long-term reference picture and the current PU's List 0 reference picture is a short-term reference picture, or vice versa, the video coder repeats this process with block 1 instead of block 0.

The video coder may perform a similar process for blocks 2, 3, and 4 to include a second candidate in the current PU's List 0 AMVP candidate list. Additionally, the video coder may repeat this entire process, swapping references to List 0 with List 1 and reference to List 1 with List 0, to generate the current PU's List 1 AMVP candidate list.

Thus, in AVMP mode, the neighboring blocks are divided into two groups: left group consisting of the block 0 and 1, and above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate; thus the temporal distance differences can be compensated.

A video coder may include a temporal motion vector predictor (TMVP) candidate, if enabled and available, into a merge MV candidate list after spatial motion vector candidates or an AMVP candidate list. For instance, in the case of AMVP, the video coder may include the TMVP candidate in the AMVP candidate list if the spatial neighboring blocks are unavailable (e.g., because the spatial neighboring blocks are outside a picture, slice, or tile boundary, because the spatial neighboring blocks are intra predicted, etc.). In merge mode, a TMVP candidate may specify List 0 and/or List 1 motion vectors of a temporal neighbor block. The reference indexes for the TMVP candidate in the merge mode are always set to 0. In AMVP mode, a TMVP candidate specifies either a List 0 motion vector of a temporal neighbor block or a List 1 motion vector of the temporal neighbor block. The temporal neighbor block is a block in a reference picture. The process of motion vector derivation for a TMVP candidate may be the same for both merge and AMVP modes.

Figure 3B:
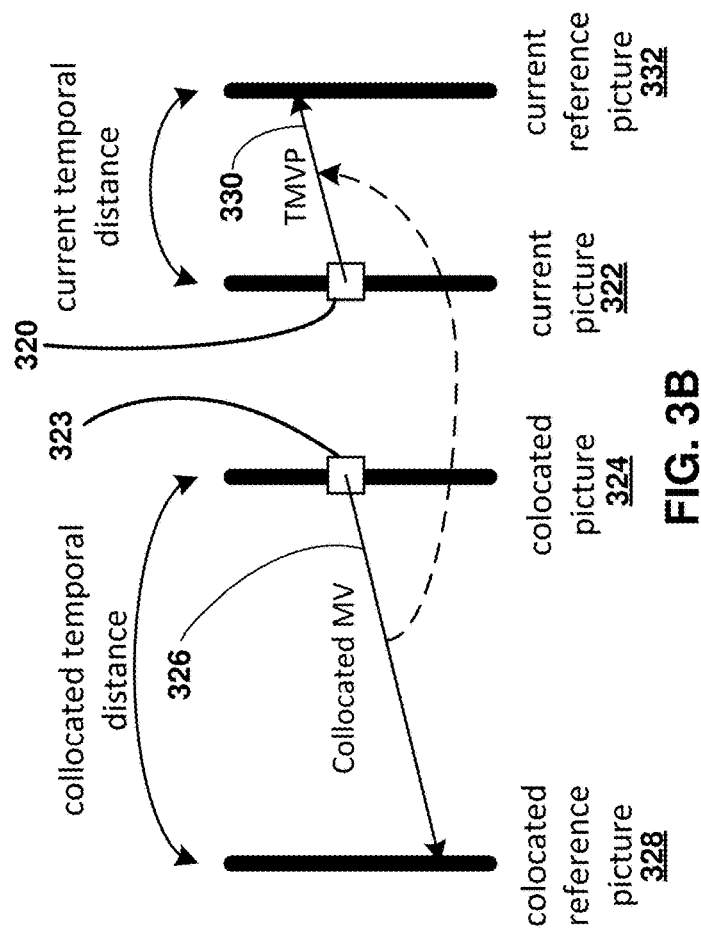
FIG. 3B illustrates motion vector scaling.
Figure 3A:
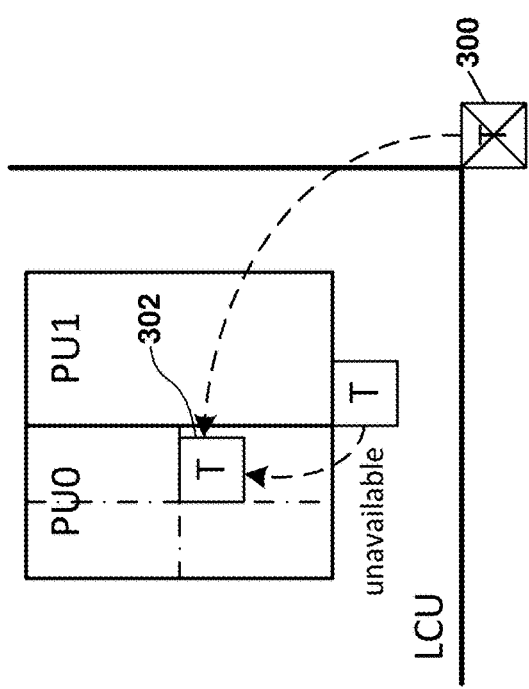
FIG. 3A is a conceptual diagram illustrating an example technique for deriving a temporal motion vector predictor (TMVP) candidate.

FIG. 3A is a conceptual diagram illustrating an example technique for deriving a TMVP candidate. As shown in FIG. 3A, a primary block location for TMVP candidate derivation is a bottom-right block 300 outside of the collocated PU. The temporal neighboring block from which the video coder derives the TMVP candidate is collocated with bottom-right block 300. In the example of FIG. 3A, bottom-right block 300 is marked as block "T" to denote "temporal." The video coder uses bottom-right block 300 instead of above or left blocks in order to compensate for the bias to the above and left blocks used to generate spatial neighboring candidates. If bottom-right block 300 is located outside of the current CTB row or motion information is not available (e.g., because a temporal reference block collocated with bottom-right block 300 is intra predicted), bottom-right block 300 is substituted with a center block 302 of the PU.

A motion vector for a TMVP candidate is derived from the co-located PU of a so-called "co-located picture." The co-located picture may be indicated in a slice level (e.g., using a collocated_ref_idx syntax element). The motion vector for the co-located PU is called a collocated MV. Similar to temporal direct mode in H.264/AVC, to derive the TMVP candidate motion vector, the co-located MV may be scaled to compensate the temporal distance differences, as shown in FIG. 3B. Particularly, in FIG. 3B, when coding a current block 320 of a current picture 322, a video coder determines a collocated block 323 in a collocated picture 324. A motion vector 326 of collocated block 323 (i.e., a collocated motion vector) indicates a location in a collocated reference picture 328. The video coder generates a TMVP 330 by scaling motion vector 326 based on a difference between a collocated temporal distance and a current temporal distance. The collocated temporal distance is a temporal distance between collocated picture 324 and collocated reference picture 328. The current temporal distance is a temporal distance between current picture 322 and a current reference picture 332.

As noted above, a video coder may scale a motion vector. When scaling a motion vector, it is assumed that the value of a motion vector is proportional to the distance of pictures in the presentation time. A motion vector associates two pictures, the reference picture, and the picture containing the motion vector (namely, the containing picture). When a motion vector is used to predict the other motion vector, the distance of the containing picture and the reference picture is calculated based on Picture Order Count (POC) values of the reference picture and the containing picture.

For a motion vector to be predicted, both its associated containing picture and reference picture may be different. Therefore, a new distance (based on POC) is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Furthermore, in some implementations, if a MV candidate list (e.g., a merge MV candidate list or an AMVP candidate list) is not complete, a video coder may generate and insert artificial motion vector candidates at the end of the MV candidate list until the MV candidate list has the required number of candidates. In merge mode, there are two types of artificial MV candidates: combined candidates derived only for B-slices and zero candidates. A combined candidate specifies a combination of a List 0 motion vector from one merge candidate and a List 1 motion vector for a different merge candidate. Zero candidates are used for motion vector prediction only if the first type (i.e., combined candidates) does not provide enough artificial candidates. A zero candidate is a candidate that specifies a MV whose horizontal and vertical components are each equal to 0.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Additionally, a video coder may apply a pruning process for candidate insertion. Candidates from different blocks may happen to be the same, which may decrease the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

In HEVC, only a translation motion model is applied for motion compensation prediction (MCP). However, in the real world, there are many kinds of motions, e.g. zoom in/out, rotation, perspective motions and the other irregular motions. In JEM, a simplified affine transform motion compensation prediction is applied to improve the coding efficiency. If a block follows an affine motion model, an MV of position (x, y) in the block can be determined by the following affine motion model:

$$\begin{cases} v_x = ax + by + c \\ v_y = dx + ey + f \end{cases} \quad (1)$$

In equation (1), $v_x$ is a horizontal component of a motion vector for position (x, y) within the block, and $v_y$ is a vertical component of the motion vector for position (x, y) within the block. In equation (1), a, b, c, d, e, and f are parameters. Note that in the affine motion model, different positions within the block have different motion vectors.

In JEM3.0, the affine motion model is simplified to a 4-parameters affine motion model by assuming a=e and b=−d. Thus, equation (1) may be simplified as shown in equation (1'), below:

$$\begin{cases} v_x = ex + -dy + c \\ v_y = dx + ey + f \end{cases} \quad (1')$$

Figure 4:
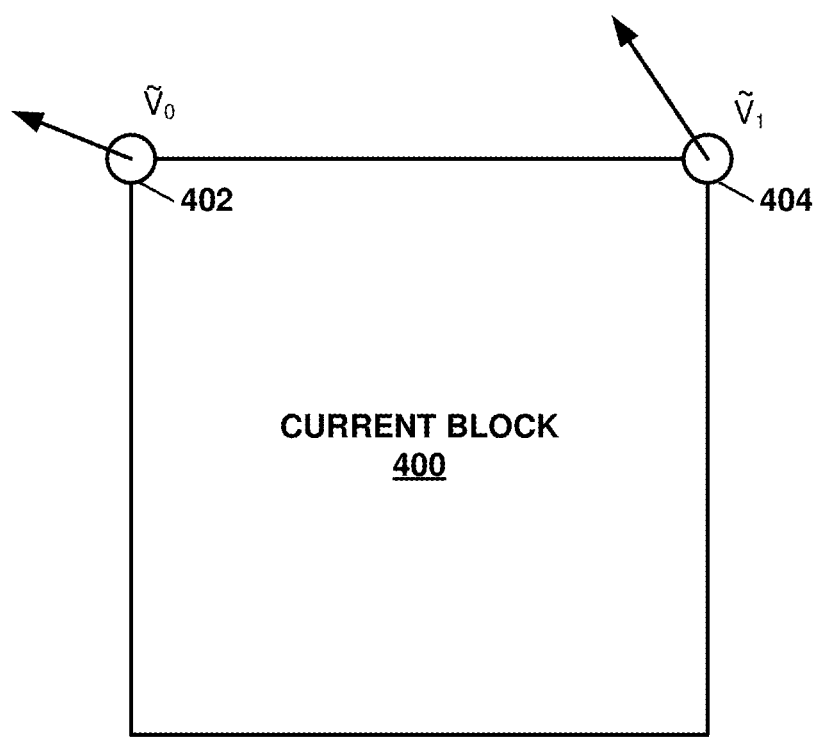
FIG. 4 illustrates a simplified affine motion model for a current block.

The 4-parameter affine motion model may be represented by a motion vector of a top-left control point ($V_0$) and a motion vector of a top-right control point ($V_1$). FIG. 4 illustrates a simplified affine motion model for a current block 400. As shown in FIG. 4, an affine motion field of the block is described by two control point motion vectors $\widetilde{V_0}$ and $\tilde{V}_1$. $\widetilde{V_0}$ is a control point motion vector for a top-left control point 402 of current block 400. $\tilde{V}_1$ is a control point motion vector for a top-right control point 404 of current block 400.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

In equation (2), $v_x$ is a horizontal component of a motion vector for a position (x, y) in a block; $v_y$ is a vertical component of the motion vector for the position (x, y) in the block; ($v_{0x}$, $v_{0y}$) is a motion vector of the top-left corner control point (e.g., top-left control point 402); ($v_{1x}$, $v_{1y}$) is a motion vector of the top-right corner control point (e.g., top-right control point 404); and w is a width of the block. Thus, a video coder may use equation (2) to "extrapolate" motion vectors for positions (x, y) based on motion vectors of control points of the block.

To further simplify the motion compensation prediction, block-based affine transform prediction is applied. Thus, rather than deriving motion vectors for each location in a block, a video coder may derive motion vectors for sub-blocks of the block. In JEM, the sub-blocks are 4×4 blocks. To derive a motion vector of a sub-block, the video coder may calculate the motion vector of a center sample of the sub-block according to equation (2). The video coder may then round the calculated motion vector to 1/16 fraction accuracy. The rounded motion vector may be referred to herein as a high-accuracy motion vector. Then, the video coder may apply motion compensation interpolation filters to generate predictions (i.e., predictive blocks) of each of the sub-blocks with derived motion vectors.

Figure 5:
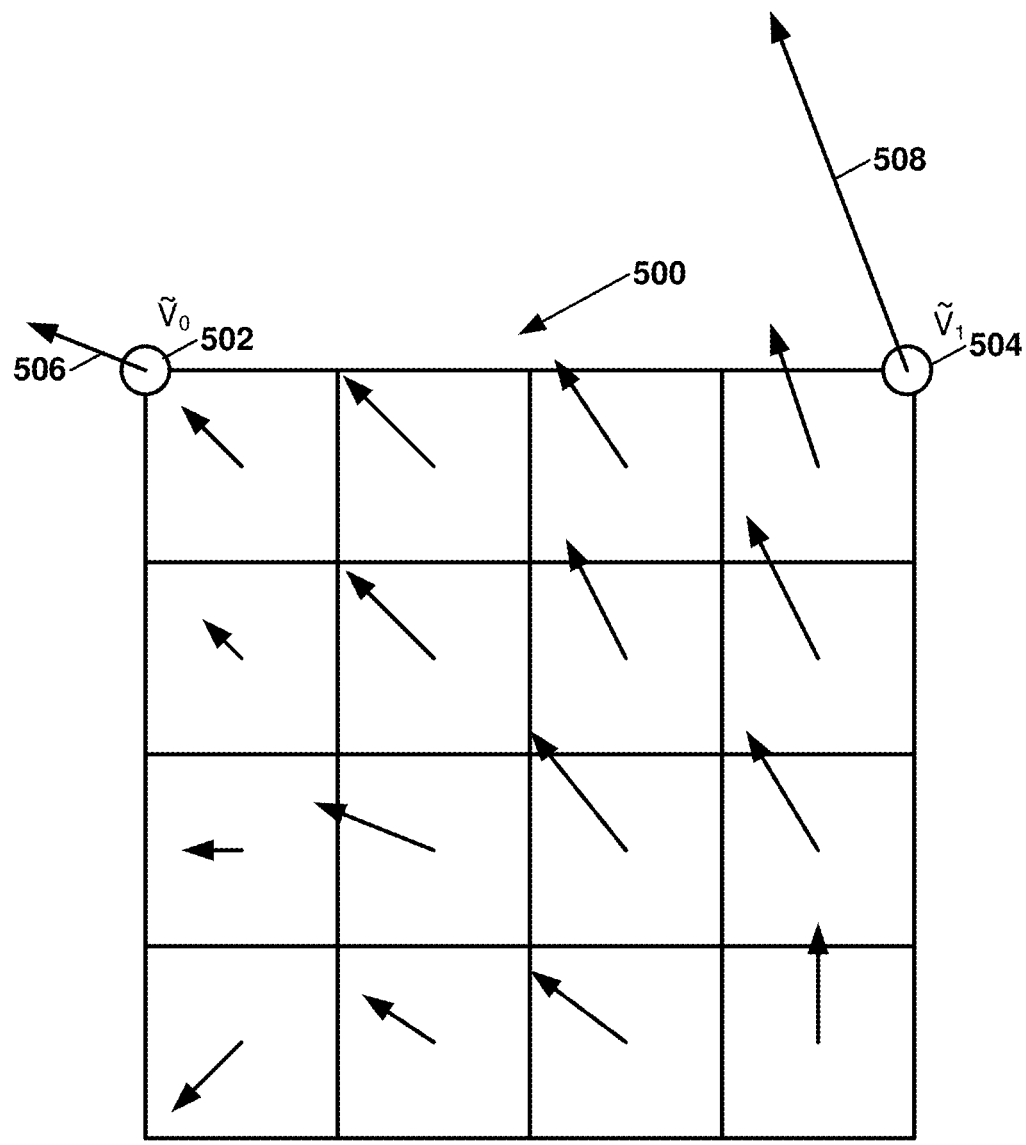
FIG. 5 illustrates an affine motion vector field (MVF) per sub-block.

FIG. 5 illustrates an example affine motion vector field (MVF) per sub-block. As shown in the example of FIG. 5, a current block 500 has a top-left control point 502 and a top-right control point 504. A video coder may calculate, based on a motion vector 506 for top-left control point 502 and a motion vector 508 for top-right control point 504, motion vectors for sub-blocks of current block 500. FIG. 5 shows the motion vectors of the sub-blocks as small arrows.

After MCP, the high-accuracy motion vector of each sub-block is rounded and saved as the same accuracy as the normal motion vector. In some examples, the rounding of the high-accuracy motion vector is only performed when the precision of the stored motion vectors is less then the high-accuracy motion vectors.

There are two affine motion modes in JEM: AF_INTER mode and AF_MERGE mode. In JEM, the AF_INTER mode can be applied for CUs with both width and height larger than 8. An affine flag is signaled at the CU level in the bitstream to indicate whether AF_INTER mode is used. In the AF_INTER mode, video encoder 20 signals a List 0 reference index and/or a List 1 reference index for the current block to indicate a List 0 reference picture and/or a List 1 reference picture.

In the AF_INTER mode, video encoder 20 and video decoder 30 each construct one or more candidate lists (i.e., affine MVP set candidate lists) for a current block. For instance, video encoder 20 and video decoder 30 may each construct a List 0 affine MVP set candidate list and/or a List 1 affine MVP set candidate list. Each of the affine MVP set candidate lists includes a respective set of affine MVP sets. In a 4-parameter affine motion model, an affine MVP set in a List 0 affine MVP set candidate list specifies two List 0 motion vectors (i.e., a motion vector pair). In a 4-parameter affine motion model, an affine MVP set in a List 1 affine MVP set candidate list specifies two List 1 motion vectors.

Figures 6A, 6B:
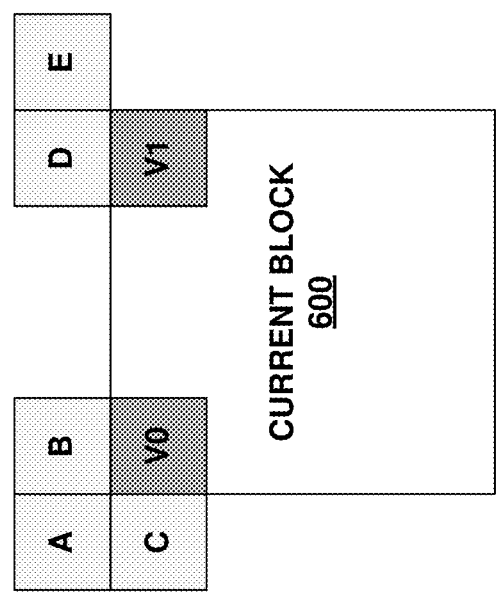
FIG. 6A is a block diagram illustrating a current block and neighboring blocks as used in the AF_INTER mode.
FIG. 6B is illustrates an example affine MVP set candidate list used in a 4-parameter affine motion model.

Initially, a video coder (e.g., video encoder 20 or video decoder 30) attempts to fill an affine MVP set candidate list with motion vector pairs of the type $\{(v_0, v_1)|v_0=\{v_A, v_B, v_C\}, v_1=\{v_D, v_E\}\}$ using neighbor blocks. FIG. 6A is a block diagram illustrating a current block 600 and neighboring blocks as used in the AF_INTER mode. As shown in FIG. 6A, $V_0$ is selected from the motion vectors of blocks A, B or C. The motion vector from the neighbor block is scaled according to the reference list and a relationship among the POC of the reference for the neighbor block, the POC of the reference for the current CU, and the POC of the current CU. For example, suppose the video coder selects a List 0 motion vector of a neighbor block (e.g., block A, B, or C) as $V_0$. In this example, the List 0 motion vector of the neighbor block indicates a position in the neighbor block's reference picture (i.e., the reference for the neighbor block). Furthermore, in this example, video encoder 20 may select and signal a List 0 reference index indicating a reference picture for the current CU (i.e., the reference for the current CU). If the neighbor block's reference picture is not the same as the reference picture for the current CU, the video coder may scale the neighbor block's List 0 motion vector based on a difference between a reference temporal distance and a current temporal distance. The reference temporal distance is a temporal distance between the POC of the neighbor block's reference picture and a POC of the current CU. The current temporal distance is a temporal distance between the POC of the current CU and a POC of the reference picture for the current CU. The video coder may perform a similar process for a List 1 motion vector. The approach to select $v_1$ from neighbor blocks D and E is similar.

If the number of candidates in the candidate list is smaller than 2, the candidate list is padded by motion vector pairs composed by duplicating each of the AMVP candidates {AMVP0, AMVP0} and {AMVP1, AMVP1}. In other words, a video coder may generate two AMVP candidates in the manner described above. The two AMVP candidates are denoted AMVP0 and AMVP1. The video coder then includes, in candidate list 620 of FIG. 6B, a first affine motion vector predictor candidate that specifies AMVP0 as a motion vector for a first control point and specifies AMVP0 as a motion vector for a second control point. If the number of candidates in the candidate list is still smaller than 2 after including the first affine MVP candidate in candidate list 620, the video coder includes a second affine MVP candidate in candidate list 620, where the second affine MVP candidate specifies AMVP1 as the motion vector for the first control point and specifies AMVP1 as the motion vector for the second control point.

When candidate list 620 is larger than 2, the video coder firstly sorts the candidates in candidate list 620 according to the consistency of the neighboring motion vectors (similarity of the two motion vectors in a pair candidate). The video coder only keeps the first two candidates, as shown in FIG. 6B with the line label "Size=2". Video encoder 20 may use a rate-distortion cost check to determine which motion vector set candidate is selected as the control point motion vector prediction (CPMVP) of the current CU. Video encoder 20 may signal in the bitstream an index indicating the position of the CPMVP in candidate list 620. Video decoder 30 may obtain the index from the bitstream and use the index to determine which of the candidates in candidate list 620 is the CPMVP. After the CPMVP of the current affine CU is determined, affine motion estimation is applied and the control point motion vector (CPMV) is found. Video encoder 20 signals in the bitstream a difference between the CPMV and the CPMVP. In other words, video encoder 20 signals a motion vector difference (MVD) in the bitstream.

Moreover, in both HEVC and JEM, an inter-picture prediction syntax element, inter_pred_idc, signals whether List 0, List 1, or both are used for a block (e.g., a CU or PU). For each MVP obtained from one reference picture list, the corresponding reference picture is signaled by an index to the reference picture list, ref_idx_l0/1, and the MV(_x;_y) is represented by an index to the MVP, mvp_l0/1_flag, and its MV difference (MVD). The MVD syntax is also signaled in the bitstream so that the MVs can be reconstructed at the decoder side. In other words, if a block is uni-directionally predicted from List 0 or bi-directionally predicted, video encoder 20 signals a ref_idx_l0 flag to indicate a location of a reference picture in List 0, signals a mvp_l0_flag to indicate a location in a List 0 AMVP candidate list of a selected motion vector predictor, and signals a List 0 MVD. If a block is uni-directionally predicted from List 1 or bi-directionally predicted, video encoder 20 signals a ref_idx_l1 flag to indicate a location of a reference picture in List 1, signals a mvp_l1_flag to indicate a location in a List 1 AMVP candidate list of a selected motion vector predictor, and signals a List 1 MVD.

In addition, video encoder 20 may signal a flag (e.g., mvd_l1_zero_flag) in a slice header. The flag indicates whether the MVD for the second reference picture list (e.g., List 1) is equal to zero and therefore not signaled in the bitstream. Not signaling the MVD for the second reference picture list may further improve the coding efficiency in some circumstances.

When a CU is coded in AF_MERGE mode, a video coder assigns to the CU the affine motion model of a block coded with affine mode from the valid neighbor reconstructed blocks occurring first in the visiting order: A→B→C→D→E. FIG. 7A shows neighboring blocks used when coding a current block 700 in AF_MERGE mode. A visiting order (i.e., a selection order) for the neighboring blocks is from left, above, above-right, left-bottom to above-left as shown in FIG. 7A. For example, if neighboring block B is the first neighboring block in the order A→B→C→D→E that is coded using in affine mode, the video coder may use the affine motion model of neighboring block B as the affine motion model of the current block. For instance, in this example, for X=0 and/or X=1, the video coder may extrapolate the List X motion vector of a top-left control point of neighboring block B to generate the List X motion vector of a top-left control point of current block

700, use a List X reference index of the top-left control point of neighboring block B as the List X reference index of the top-left control point of current block 700, extrapolate the List X motion vector of a top-right control point of neighboring block B to generate the List X motion vector of a top-right control point of current block 700, and use a List X reference index of the top-right control point of neighboring block B as the List X reference index of the top-right control point of current block 700. In this example, the video coder may use equation (2), above, to extrapolate a motion vector of a control point of neighboring block B to determine a motion vector of a control point of current block 700, using an (x, y) position of the control point of current block 700 as x and y in equation (2).

Figure 7B:
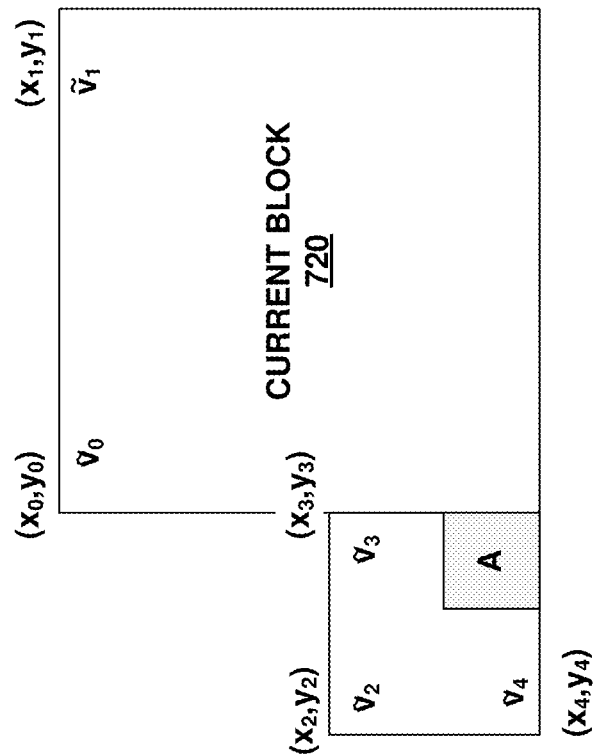
FIG. 7B illustrates candidates for AF_MERGE.
Figure 7A:
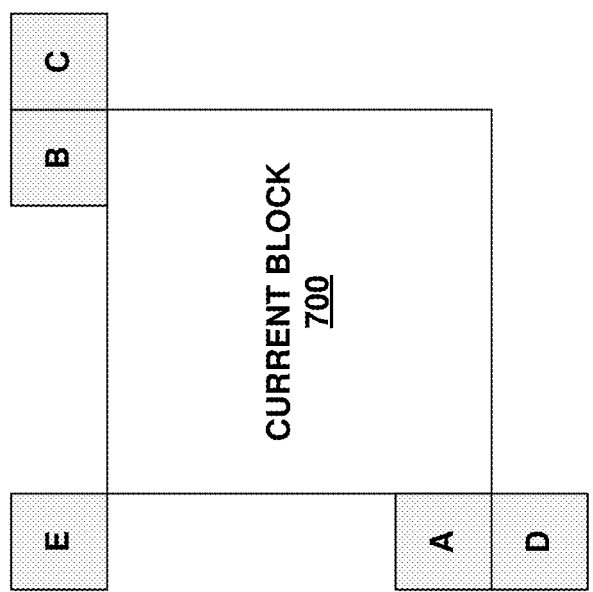
FIG. 7A shows neighboring blocks used when coding a current block in AF_MERGE mode.

If the neighbor left-bottom block A is coded in affine mode as shown in FIG. 7B, the motion vectors $v_2$, $v_3$ and $v_4$ of the top-left corner, above-right corner and left-bottom corner of current block 720 which contains the block A are derived. The motion vector $v_0$ of the top-left corner on current block 720 is calculated according to $v_2$, $v_3$ and $v_4$. Secondly, the motion vector $v_1$ of the above right of the current CU is calculated. To be specific, a 6-parameters affine motion model is first constructed by the motion vectors $v_2$, $v_3$ and $v_4$ as shown in equation (3), below, and the $v_0$ and $v_1$ values are then calculated by this 6-parameters affine motion model. That is, when used with the (x, y) position of the top-left control point of current block 720 (i.e., $\widetilde{V_0}$), $v_x$ in equation (3) is the x component of the motion vector of $\widetilde{V_0}$ (i.e., $v_{0x}$) and $x_y$ in equation (3) is the y component of $\widetilde{V_0}$ (i.e., $v_{0y}$). Similarly, when used used with the (x, y) position of the top-right control point of current block 720 (i.e., $\widetilde{v_1}$), $v_x$ in equation (3) is the x component of the motion vector of $\widetilde{v_1}$ (i.e., $v_{1x}$) and $x_y$ in equation (3) is the y component of $\widetilde{v_1}$ (i.e., $v_{1y}$).

$$\begin{cases} v_x = \frac{(v_{3x} - v_{2x})}{w} x + \frac{(v_{4x} - v_{2x})}{h} y + v_{2x} \\ v_y = \frac{(v_{3y} - v_{2y})}{w} x + \frac{(v_{4y} - v_{2y})}{h} y + v_{2y} \end{cases} \quad (3)$$

After the CPMV of the current CU's $v_0$ and $v_1$ are derived, according to the simplified affine motion model of equation (1), the motion vector field of the current CU is generated. To identify whether the current CU is coded with AF_MERGE mode, an affine flag is signalled in the bit stream when there is at least one neighbor block is coded in affine mode.

In addition to the 4-parameter affine motion model in JEM, an affine motion model with 6-parameter is described in JVET-00062. In 6-parameter affine model, there is no constraint on the scaling factors between horizontal and vertical directions. Three corner motion vectors are used to represent the 6-parameter model.

Figures 8A, 8B:
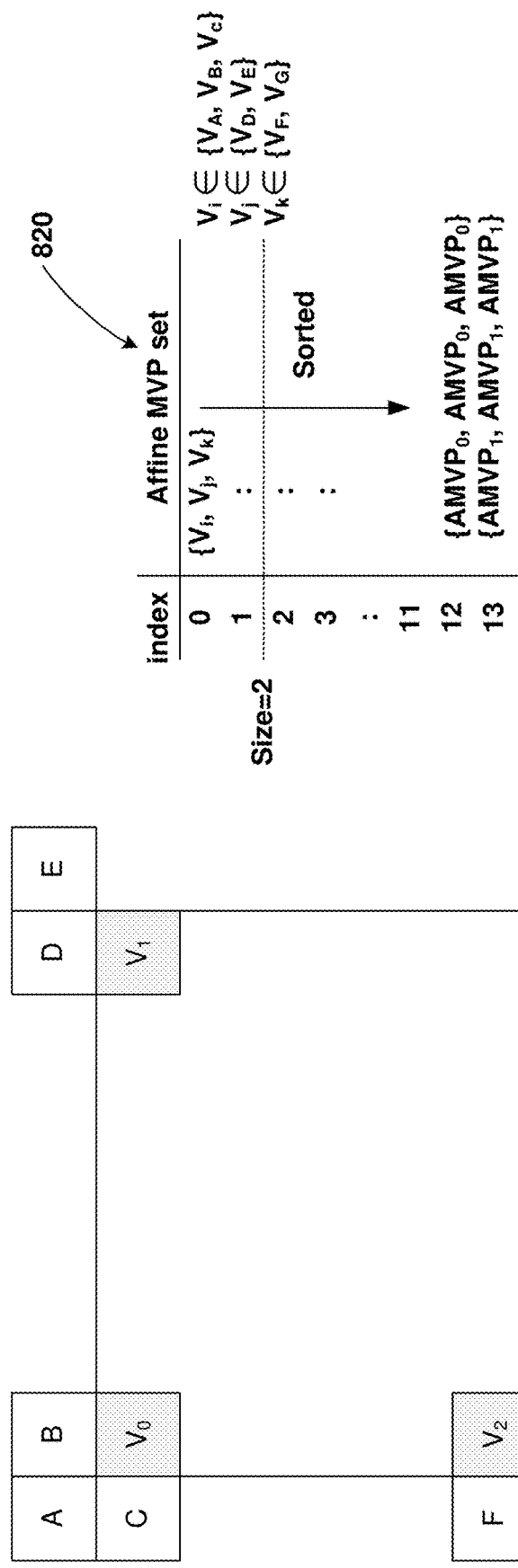
FIG. 8A illustrates example blocks used in a 6-parameter affine motion model.
FIG. 8B illustrates an example affine MVP set candidate list used in a 6-parameter affine motion model.

FIG. 8A illustrates example blocks used in a 6-parameter affine motion model. FIG. 8B illustrates an example affine MVP set candidate list 820 used in a 6-parameter affine motion model. The following six equations describe the horizontal (x) and vertical (y) components of the motion vectors at the three corners ($V_0$, $V_1$, and $V_2$, as illustrated in FIG. 8A):

$$\begin{cases} V0\_x = c \\ V0\_y = f \end{cases} \quad (4)$$

-continued
$$\begin{cases} V1\_x = a \times \text{width} + c \\ V1\_y = d \times \text{width} + f \end{cases}$$

$$\begin{cases} V2\_x = b \times \text{height} + c \\ V2\_y = e \times \text{height} + f \end{cases}$$

By solving equations (4), the 6-parameter affine model can be determined by substituting the solutions into equation (1).

Similar to the 4-parameter AF_INTER mode, a candidate list with motion vector set $\{(v_0, v_1, v_2)|v_0=\{v_A, v_B, v_C\}, v_1=\{v_D,v_E\}, v_2=\{v_F,v_G\}\}$ for the 6-parameter AF_INTER mode is constructed using the neighbor blocks. Thus, in the example of FIG. 8B, each affine MVP set (i.e., each candidate) in affine MVP set candidate list 820 includes three motion vectors. In the AF_INTER mode, a video coder may generate two affine MVP set candidate lists of the type shown in FIG. 8B. One of the affine MVP set candidate lists includes affine MVP sets that specify List 0 motion vectors. The other affine MVP set candidate list includes affine MVP sets that specify List 1 motion vectors.

The design of affine motion in HEVC/JEM may have the following problems. For example, the correlation of the affine motion of List 0 and List 1 are not utilized for MV prediction for blocks coded with affine mode. In another example, the correlation of the affine motion of a current block and a neighbor block are not utilized for MV prediction for blocks coded with affine mode. In yet another example, the List 1 zero MVD may harm the performance of affine motion models due to inaccurate MV of the control points. This disclosure describes techniques that may overcome these problems, and potentially improve coding efficiency.

In some examples of this disclosure, the affine motion model is a 6-parameters motion model as shown in equation (1). In JEM-3.0, the affine motion model for a block is represented by the motion vectors of the control points (V0, V1). In JVET-00062, the affine motion model for a block is represented by the motion vectors of the control points (V0, V1, V2). However, it may be desirable to represent the affine motion model by signaling the parameters a, b, c, d, e, f in equation (1) or simplified 4 parameters. The affine motion model can also be further interpreted as equation (5) where $O_x$ and $O_y$ are the translation offsets, $S_x$ and $S_y$ are the scaling ratio in the x and y directions and $\Theta_x$ and $\Theta_y$ are the rotation angles.

$$\begin{cases} v_x = s_x * \cos\theta_x * x - s_y * \sin\theta_y * y + O_x \\ v_y = s_x * \sin\theta_x * x + s_y * \cos\theta_y * y + O_y \end{cases} \quad (5)$$

This disclosure proposes several methods to improve the motion vector predictor (MVP) or parameter prediction of affine motion prediction. Note that a video coder may perform the parameter prediction for representation of a, b, c, d, e, f in equation (1) or $O_x$, $O_y$, $S_x$, $S_y$, $\Theta_x$ and $\Theta_y$ in equation (5).

The several techniques of this disclosure are listed below.
1) Affine motion vector prediction and affine parameters prediction between List 0 and List 1.
2) Affine motion vector prediction between control points and affine parameters prediction between sets of parameters.
3) Affine motion vector prediction and affine parameter prediction from neighbor blocks. The neighbor blocks are not limited to be spatial neighbor blocks. Rather, in some examples, temporal neighbor blocks are used.
4) Sub-block Affine Motion Prediction and sub-block affine parameter prediction, wherein each sub-block may have its own control points and/or parameters.
5) Refine the additional MVP candidates generation
6) Disable Zero L1 MVD for affine Inter Mode in GPB Slices.

The techniques of this disclosure may be applied individually. Alternatively, any combination of the techniques may be applied. This disclosure elaborates more details of each of the techniques below.

As mentioned above, one of the shortcomings of the design of affine motion in HEVC and JEM is that the correlation between the affine motion of List0 and List 1 is not utilized. In other words, the existing approaches signal affine control points independently for List 0 and List 1. Exploiting the correlation between the affine motion of List0 and List 1 may represent an opportunity to increase coding efficiency.

Thus, in accordance with a technique of this disclosure, video encoder 20 and video decoder 30 may use an affine motion model in one inter prediction direction to improve the signaling of the affine motion model in another inter prediction direction. An affine motion model in a particular inter prediction direction is an affine motion model that specifies motion vectors pointing to locations in reference pictures in a particular reference picture list corresponding to the inter prediction direction.

For example, to utilize the correlation between the MVs of List 0 and List 1, video encoder 20 and video decoder 30 may use the MVs of List 0 as a MV predictor for the MVs of List 1, or vice versa. Video decoder 30 may decide to use List 0-to-List 1 MV prediction or List 1-to-List 0 MV prediction according to a prediction direction indication. The prediction direction indication may be explicitly signaled or implicitly derived.

Video decoder 30 may derive an implicit prediction direction indication using decoded or reconstructed information. In one example, the prediction direction indication is dependent on the MVPs in the affine MVP set candidate lists (i.e., MVP lists) of each prediction direction. If a MVP list of one prediction direction contains MVPs derived from some less-preferable methods (e.g., a scaled motion vector predictor, or an MVP derived from a block coded with a local illumination compensation mode), the affine model from another prediction direction is used to predict the affine model in the current prediction direction. Alternatively, the prediction direction indication may depend on how many different MV predictors are in each list.

In another example, if a MVP list of one prediction direction contains MVPs derived from some higher-preference methods (e.g., a non-scaled motion vector predictor, or it is from a block coded with frame rate up-conversion (FRUC) mode), the affine model from a current prediction direction is used to predict the affine model in the other prediction direction. In the FRUC mode, motion information of a block is not signaled, but is derived at the decode side.

In one example, if there is any low-priority MVP in the MVP set candidate list for List 1, the Prediction Direction Indication is set as List 0-to List 1 and in the MV prediction process, the MVs of List 0 is used as the MVP for the MVs of List 1. Otherwise, if there is no low-priority MVP in the MVP set candidate list for List 1, the Prediction Direction Indication is set as List 1-to List 0 and in MV prediction process, MVs of List 1 are used as the MVPs for the MVs of List 0.

After the Prediction Direction Indication is determined, the to-be-replaced MVP set candidates (with N candidates) are determined according to the decoded or reconstruction information at the decoder side. In one example, the to-be-replaced MVP set candidate is the first MVP set candidate containing at least one low-priority MVPs. In one example, the low-priority may be given for spatial MVPs scaled according to POC information, padded AMVP MVPs, and temporal MVPs.

In one example, furthermore, when there is no to-be-replaced MVP set candidate, the affine Motion Vector Prediction between List 0 and List 1 is not performed. In some examples, the number of to-be-replaced MVP set candidates N is set to 1. In one example, if the Prediction Direction Indication is set as List 0-to-List 1 MV prediction, the MVPs of the to-be-replaced MVP set candidate in List 1 are then replaced by the scaled MVs of the corresponding control points in List 0, respectively, or vice versa.

In another example, if the Prediction Direction Indication is set as List 0-to-List 1 MV prediction, only partial MVPs of the to-be-replaced MVP set candidate in List 1 are replaced by the scaled MVs of the corresponding control points in List0, respectively, or vice versa. For example, only the first MVP (V0) is replaced.

In another example, if the Prediction Direction Indication is set as List 0-to-List 1 MV prediction, only the first MVPs (V0) of the to-be-replaced MVP set candidate in List 1 is replaced by the scaled MVs of the corresponding control points in List0 respectively. The second MVP (V1) of the to-be-replaced MVP set candidate in List 1 is replaced by the scaled MVs of the first control points (V0) in List0 plus the difference between the MVs of the first and second control points in List0 (V1-V0). The approach to replace the third MVPs (V2) for 6-parameter affine model is similar. If the Prediction Direction Indication is set as List1-to-List0 MV prediction, only the first MVPs (V0) of the to-be-replaced MVP set candidate in List 0 is replaced by the scaled MVs of the corresponding control points in List 1, respectively. The second MVP (V1) of the to-be-replaced MVP set candidate in List 0 is replaced by the scaled MVs of the first control points (V0) in List 1 plus the difference between the MVs of the first and second control points in List 1 (V1-V0). And the approach to replace the third MVPs (V2) for 6-parameter affine model is similar.

In some examples, the MVs of the control points may be used as the MVP candidate for the MVs of the other control points. In one example, the MV of the top-left control point (V0) is used as the MVP candidate for the MV of the top-right control point (V1). Similarly, under 6-parameters affine motion model, the MV of the top-left control point (V0) is used as the MVP candidate for the MV of the top-right control point (V1). Moreover, this motion vector prediction between control points can be selectively applied. Alternatively, under 6-parameter affine model, the motion vector of the top-left control point (V0) is used as predictor of the motion vector of the top-right control point (V1) (or the bottom-left control point (V2)), and the pair of V0 and V1 (or the pair of V0 and V2) is used to derive motion vector predictor for V2 (or V1) by using a 4-parameter affine motion model. In one example, only the second MVP set candidate is applied the MV prediction between control points.

In another example, an affine model can be derived from the motion vector of one control point and additional signaled model parameters. The signaled parameters include, but are not limited to, the motion vector differences between control points or affine rotation degree, and so on. In one example, a motion vector of one of the control points of the current block, together with the rotational degree, are signaled for a block coded as affine motion mode. For each affine block, the affine motion model is constructed using the motion vector of the control point and the rotational angle.

In accordance with particular techniques of this disclosure, a video coder may use neighbor-extrapolated motion vectors as affine motion vector predictors for control points of a current affine block. For example, for a current inter block, a video coder may utilize motion models of one or more of the current inter block's neighboring affine blocks (e.g., neighboring blocks encoded in AF_INTER mode or AF_MERGE mode), named source affine blocks, to predict an affine motion model for the current inter block (i.e., the current affine motion model). For example, the MVPs of the control points of the current block may be extrapolated from the control points of the neighboring blocks. For instance, for each respective control point of the current block, the video coder may use equation (2), above, to extrapolate an MVP for the respective control point of the current block from the motion vectors of the control points of a source affine block. The source affine blocks may be one or more spatial neighbor blocks or temporal neighbor blocks.

In one example, the source affine block is determined as the first block coded with affine mode from the valid spatial neighbor blocks based on a predefined visiting order (e.g., A→B→C→D→E or B→A→D→C→E or any other visiting order of the blocks shown in FIG. 7A).

In another example, the source affine block is determined as the first block coded with affine mode from the neighbor blocks according to one or more pre-defined priority sets based on a pre-defined visiting order (e.g. A→B→C→D→E or B→A→D→C→E or any other visiting order as shown in FIG. 7A and FIG. 7B). Those neighboring affine blocks which do not meet any of the priorities are regarded as not available.

In some examples, the source affine block is determined according to a visiting order first and then a pre-defined priority order. For example, the source affine block may be determined according to the following order: A (priority 1)→B (priority 1)→C (priority 1)→(priority 1)→(priority 1)→(priority 2)→ and so on. In this example, a video coder first checks whether block A is in priority set 1; if not, the video coder checks whether block B is in priority set 1; if not, the video coder checks whether block C is in priority set 1; and so on.

In another example, a video coder may determine the source affine block according to a pre-defined priority order first and then the visiting order. For example, A (priority 1)→(priority 2)→(priority 1)→(priority 2)→(priority 1)→(priority 2)→ and so on. Thus, in this example, the video coder first checks whether block A is in priority set 1; if not, the video coder checks whether block A is in priority set 2; if not, the video coder checks whether block B is in priority set 1; and so on.

In various examples, priority sets are defined in different ways. The definitions of various example priority sets are listed as below. The following definitions of priority sets may be applied individually. Alternatively, any combination of them may be applied.

A first example priority set is defined as below, where smaller numbers represent higher priority:
1. A neighboring affine block is in priority set 1 if a List X reference picture of the neighbor affine block is the same reference picture as a List X reference picture of the current block, where List X is the reference picture list of the current block currently being evaluated and X is either 0 or 1.
2. A neighboring affine block is in priority set 2 if a List X reference picture of the neighbor affine block is the same reference picture as a List Y reference picture of the current block, where List Y is the reference picture list other than the reference picture list of the current block currently being evaluated and Y is either 0 or 1.

In another example, a priority set is defined as below:
1. A neighboring affine block is in priority set 1 if a List X reference picture of the neighbor affine block is different from a List X reference picture of the current block, where List X is the reference picture list of the current block currently being evaluated and X is either 0 or 1.
2. A neighboring affine block is in priority set 2 if a List Y reference picture of the neighbor affine block is different from a List Y reference picture if the current block, where List Y is a reference picture list other than a reference picture list of the current block currently being evaluated and Y is either 0 or 1.

In another example, the priority set is defined as below:
1. The MV differences of the neighbor affine blocks are within a pre-defined range.
2. The MV differences of the neighbor affine blocks are not within a pre-defined range.

In another example, the priority set is defined as below. In this and other examples, smaller numbers may represent higher priority.
1. A neighbor affine block is in priority set 1 if the neighboring affine block is coded in AF_INTER mode.
2. A neighbor affine block is in priority set 2 if the neighboring affine block is coded in AF_MERGE mode.

In another example, the priority of a neighboring affine block depends on whether the neighbor affine block has the same inter prediction direction as the current affine block. In another example, the priority of a neighboring affine block depends on the size of the neighbor affine block. For example, the neighboring affine blocks with larger sizes may have higher priority.

In one example, the video coder selects, as the source affine block for List X, a neighbor affine block that has the same List X reference picture as the current block and occurs first in the following visiting order: B→A→D→C→E. In this example, if no neighbor affine block is available (e.g., none of the neighbor affine blocks has the same List X reference picture as the current block), the video coder may select, as the source affine block, the neighboring affine block having as its List Y reference picture, the current block's List X reference picture and occurs first in the in the following visiting order: B→A→D→C→E, where X is 0 or 1 and Y is (1-X).

In one example, in case that the bi prediction affine model is used in the current block, the source affine block for List 0 and List 1 can be different. In other words, the video coder may use different source affine blocks when evaluating List 0 and List 1 for the current block. The above-mentioned source affine block selection process can be applied individually for each reference picture list.

After the video coder selects the source affine block, the video coder extrapolates a set of MV predictors for the control points of the current block using the MVs of the control points of the source affine block. For example, in a 4-parameter affine motion model, the video coder may extrapolate a List X MV of the first control point of the current block from a List X MV of the first control point of the source affine block. Additionally, in this example, the video coder may extrapolate a List X MV of the second control point of the current block from a List X MV of the second control point of the source affine block. In this example, X is either 0 or 1 and the resulting pair of extrapolated List X MVs is termed an extrapolated motion vector predictor (MVP) set and may be denoted $\{V'_0, V'_1\}$. The video coder may use equation (2) to perform the extrapolation, as described elsewhere in this disclosure. In a 6-parameter affine motion model, the video coder may also extrapolate a List X MV of the third control point of the current block from a List X MV of the third control point of the source affine block. The extrapolated List X MV of the third control point of the current block may also be included in a motion vector predictor set and may be denoted $\{V'_0, V'_1, V'_2\}$.

The video coder may then insert the extrapolated List X MVP set (e.g., $\{V'_0, V'_1\}$ for a 4-parameter affine motion model or $\{V'_0, V'_1, V'_2\}$ for a 6-parameter affine motion model) into a List X affine MVP set candidate list. After the video coder inserts the extrapolated MVP set into the List X affine MVP set candidate list, the video coder inserts a conventional affine MVP set candidate into the List X affine MVP set candidate list. The conventional affine MVP set candidate may be an affine MVP set candidate generated in accordance with other examples provided in this disclosure. The video coder may insert the conventional MVP set candidate into the List X affine MVP set candidate list after or before the extrapolated MVP set. If the current block is bi-directionally predicted, the video coder may perform a similar process for List Y, where Y is equal to 1−X.

FIG. 9 illustrates an example affine MVP set candidate list 900 that includes an extrapolated MVP set 902, in accordance with a technique of this disclosure. In the example of FIG. 9, the extrapolated MVP set $\{V'_i, V'_j\}$ (902) is inserted into the first position of affine MVP set candidate list 900 followed by conventional MVP set candidates. The video coder may construct the remainder of affine MVP set candidate list 900 in the same manner as candidate list 620 (FIG. 6B) or affine MVP set candidate list 820 (FIG. 8B).

In one example, the extrapolation process can be the same as AF_MERGE mode described above using equation (1) or (2), depending on whether a 4-parameter affine motion model or a 6-parameter affine motion model is used to perform MV extrapolation. Alternatively, other extrapolation functions may be applied. For example, a video coder may apply a bilinear function the motion vectors of the control points of an affine source block to perform the extrapolation process.

In some examples, the video coder selects a second source affine block in addition to selecting a source affine block as described above. The video coder may select the second source affine block by continuing to search for a source affine block after selecting the first source affine block. The video coder may conduct the search in accordance with any of the examples described above for selecting the source affine block. The video coder may extrapolate a second MVP set for the control points of the current block using the MVs of the control points of the second source affine block and may insert the second MVP set as another MVP set candidate in the affine MVP set candidate list.

In another example, a video coder selects two or more source affine blocks when coding a current block. In this example, the video coder derives a set of MV predictors for the control points of the current block using the MVs of some or the video coder inserts all control points of the source affine blocks as another MVP set candidate.

In accordance with a technique of this disclosure, in affine inter mode (i.e., AF_INTER) or affine merge mode (i.e., AF_MERGE), the affine motion of each sub-block (e.g. 4×4 block) of a current block can be predicted or directly inherited from the extrapolated motion of its own neighbor blocks. In one example, the neighbor block is selected as the nearest neighbor affine block for each sub-block. In other words, a current block may be partitioned into a plurality of equally-sized sub-blocks (e.g., 4×4 sub-blocks). For each respective sub-block of the plurality of sub-blocks, the video coder may determine a nearest block that was predicted using an affine motion model. In cases where the respective sub-block is along a border of the current block, the nearest block that was predicted using an affine motion model may be outside the current block. For instance, for a top-left sub-block of the current block, the nearest block that was predicted using an affine motion model may be a block above and left of the top-left sub-block. Similarly, for a top-right sub-block of the current block, the nearest block that was predicted using an affine motion model may be a block above the top-right sub-block or a block above and right of the top-right sub-block. For a sub-block in the interior of the current block, the nearest block that was predicted using an affine motion model may be another sub-block of the current block that is above or left of the sub-block.

This approach differs from the way that sub-blocks are used in JEM3.0. As discussed above, in JEM3.0, a video coder calculates the motion vectors of each sub-block of a current block based only on the motion vectors of the control points at the top-left and top-right corners of the current block. In contrast, in accordance with this technique of this disclosure, the motion vectors of the sub-blocks are not calculated based on the motion vectors of the control points, but rather are predicted or directly inherited from extrapolated motion of neighbor blocks. This may result in greater coding efficiency because the motion vectors of the sub-blocks may be taken from locations closer to the sub-blocks.

Figure 10:
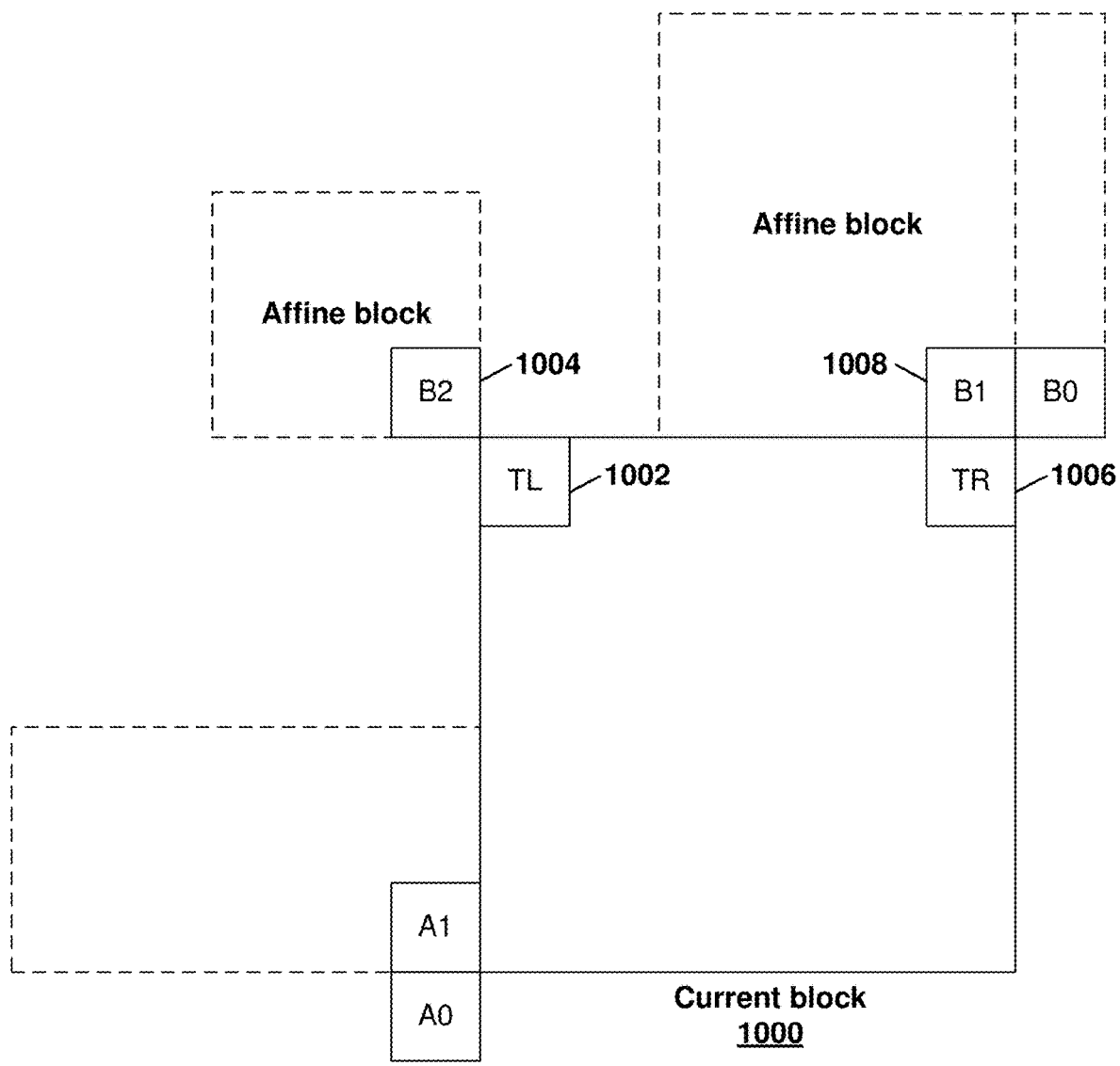
FIG. 10 illustrates sub-block motion prediction or parameter prediction, in accordance with a technique of this disclosure, where the affine motion of each sub-block of a current block can be predicted or directly inherited from the extrapolated motion of its own neighbor blocks.

FIG. 10 illustrates sub-block motion prediction or parameter prediction, in accordance with a technique of this disclosure, where the affine motion of each sub-block (e.g. 4×4 block) of a current block 1000 can be predicted or directly inherited from the extrapolated motion of its own neighbor blocks. As shown in the example of FIG. 10, the affine motion of a TL sub-block 1002 is predicted using the extrapolated motion of neighbor block B2 (1004) while the TR sub-block 1006 uses the extrapolated motion of the neighbor block B1. In another example, the sub-block can also use extrapolated motion of the temporal neighbor blocks.

In affine inter mode or affine merge mode, the affine parameters (e.g., a, b, c, d, e, and f in equations (1) or (4) of each sub-block (e.g. 4×4 block) of a current block can be predicted or directly inherited from its own neighbor blocks. In one example, the neighbor block is selected as the nearest neighbor affine block for each sub-block. For example, as shown in FIG. 10, the affine parameters of TL sub-block 1002 are predicted using the neighbor block B2 (1004) while the TR sub-block 1006 uses the neighbor block B1 (1008).

In the current design of affine motion prediction in JEM3.0, if the size of an affine MVP set candidate list of a current block is smaller than 2, the video coder pads the affine MVP set candidate list with one or more affine MVP sets composed by duplicating each of the AMVP candidates. This disclosure may use the term "AMVP-derived candidate" to refer to an affine MVP set composed by duplicating AMVP candidates. However, if the List X motion vector of control point V0 (FIG. 6A) and the List X motion vector of control point V1 are the same in the 4-parameter affine motion model or List X motion vectors of control points V0, V1 and V2 (FIG. 8A) are the same in the 6-parameter affine motion model, the calculated MVs for each sub-block of the current block are identical. When the calculated MVs for each sub-block of the current block are identical, the results are the same as conventional motion compensated prediction. However, arriving at the same motion compensated prediction result using affine motion prediction may result in less coding efficiency than conventional motion compensated prediction. Therefore, including in the affine MVP set candidate list an AMVP-derived candidate that provides the same result as conventional motion compensated prediction represents a lost opportunity to include in the affine MVP set candidate list an affine MVP set that may result in better coding efficiency than conventional motion compensated prediction.

Hence, in accordance with a technique of this disclosure, a video coder adds an offset to one or more MVPs in an AMVP-derived candidate to make sure not all the MVPs within the AMVP-derived candidate are identical. Including a diversity of affine MVP sets in an affine MVP set candidate list may improve the likelihood that use of one of the affine MVP sets in the affine MVP set candidate list results in greater coding efficiency.

FIG. 11A illustrates an example affine MVP set candidate list for a 4-parameter affine motion model, in accordance with a technique of this disclosure. FIG. 11B illustrates an example affine MVP set candidate list for a 6-parameter affine motion model, in accordance with a technique of this disclosure. As shown in the example of FIG. 11A, under 4-parameter affine motion model, the video coder adds and offset to the MVP for control point V1. As shown in the example of FIG. 11B, for a 6-parameter affine motion model, the video coder adds an offset to the MVP for control point V2. In some examples, the offset is different for AMVP-derived candidates at different positions in the affine MVP set candidate list. For example, the video coder may use +4 as the offset for the first AMVP-derived candidate and may use −4 as the offset for the second AMVP-derived candidate.

In the example of FIG. 11A, a video coder generates a List X candidate list 1100 (i.e., an affine MVP set) for a current block, where X is 0 or 1. To generate candidate list 1100, the video coder checks potential candidates. Each of the potential candidates is a combination of a List X motion vector of a block selected from blocks $V_A$, $V_B$ and $V_C$ (FIG. 6A) and a List X motion vector of a block selected from $V_D$ and $V_E$ (FIG. 6A). If both blocks in the potential candidate specify a List X motion vector, the video coder includes the potential candidate as a candidate in candidate list 1100. The video coder stops adding candidates after candidate list 1100 includes two candidates.

After checking all of the potential candidates, if there are still fewer than 2 candidates in candidate list 1100, the video coder may add a first AMVP-derived candidate 1102 to candidate list 1100. The first AMVP-derived candidate 1102 specifies a first AMVP-derived motion vector predictor 1104 and a second AMVP-derived motion vector predictor 1106. The first AMVP-derived motion vector predictor 1104 is a motion vector predictor for a first control point of the current block. The second AMVP-derived motion vector predictor 1106 is a motion vector predictor for a second control point of the current block. The video coder derives the first AMVP-derived motion vector predictor 1104 in the same manner that the video coder uses to derive a first motion vector candidate in AMVP. This disclosure describes a technique for deriving motion vector candidates in AMVP above. The second AMVP-derived motion vector predictor 1106 is equal to the first AMVP-derived motion vector predictor 1104 plus a first offset (i.e., $Offset_0$) to at least one of a horizontal or a vertical component of the first AMVP-derived motion vector predictor 1104.

If there are still less than 2 candidates in candidate list 1100 after adding the first AMVP-derived candidate 1102 to candidate list 1100, the video coder adds a second AMVP-derived candidate 1108 to candidate list 1100. The second AMVP-derived motion candidate 1108 specifies a third AMVP-derived motion vector predictor 1110 and a fourth AMVP-derived motion vector predictor 1112. The video coder derives the third AMVP-derived motion vector predictor 1110 in the same manner that the video coder uses to derive a second motion vector candidate in AMVP. The fourth AMVP-derived motion vector predictor 1112 is the same as the third AMVP-derived motion vector 1110, except the video coder adds a second offset (i.e., $Offset_1$) to at least one of a horizontal or a vertical component of the third AMVP-derived motion vector predictor 1110. If there are 2 candidates in candidate list 1100 after adding the first AMVP-derived candidate 1102 to candidate list 1100, the video coder does not add the second AMVP-derived candidate 1108 to candidate list 1100. If the current block is bi-directionally predicted, the video coder may repeat the process described above for generating candidate list 1100 with respect to List Y motion vectors, where Y is equal to 1−X.

The example of FIG. 11B shows a similar process, except using a 6-parameter affine motion model. Thus, to generate candidate list 1120, the video coder checks potential candidates. Each of the potential candidates is a combination of List X motion vector of a block selected from blocks $V_A$, $V_B$ and $V_C$ (FIG. 8A), a List X motion vector of a block selected from $V_D$ and $V_E$ (FIG. 8A), and a List X motion vector of a block selected from $V_F$ and $V_G$ (FIG. 8A). After checking each of the combinations, if there are still less than 2 candidates in candidate list 1120, the video coder may add a first AMVP-derived candidate 1122 to candidate list 1120. The first AMVP-derived candidate 1122 specifies a first AMVP-derived motion vector predictor 1124 (denoted $AMVP_0$ in FIG. 11B), a second AMVP-derived motion vector predictor 1126, and a third AMVP-derived motion vector predictor 1128. The first AMVP-derived motion vector predictor 1124 is a motion vector predictor for a first control point of the current block, the second AMVP-derived motion vector predictor 1126 is a motion vector predictor for a second control point of the current block, and the third AMVP-derived motion vector predictor 1128 is a motion vector predictor for a third control point of the current block. The video coder derives the first AMVP-derived motion vector predictor 1124 in the same manner that the video coder uses to derive a first motion vector candidate in AMVP. The second AMVP-derived motion vector predictor 1128 is equal to the first AMVP-derived motion vector predictor 1126. The third AMVP-derived motion vector predictor 1128 is equal to the first AMVP-derived motion vector predictor plus a first offset (i.e., $Offset_0$) to at least one of a horizontal or a vertical component of the first AMVP-derived motion vector 1124.

If there are still less than 2 candidates in candidate list 1120 after adding the first AMVP-derived candidate 1122 to candidate list 1120, the video coder adds a second AMVP-derived candidate 1130 to candidate list 1120. The second AMVP-derived motion candidate 1130 specifies a fourth AMVP-derived motion vector predictor 1132 (denoted $AMVP_1$ in FIG. 11B), a fifth AMVP-derived motion vector predictor 1134, and a sixth AMVP-derived motion vector predictor 1136. The video coder derives the fourth AMVP-derived motion vector predictor 1132 in the same manner that the video coder uses to derive a second motion vector candidate in AMVP. The fifth AMVP-derived motion vector predictor 1134 is the same as the fourth AMVP-derived motion vector 1132. The sixth AMVP-derived motion vector predictor 1136 is equal to the third AMVP-derived motion vector predictor 1132 plus a second offset (i.e., $Offset_1$) to at least one of a horizontal or a vertical component of the third AMVP-derived motion vector predictor 1132. If there are 2 candidates in candidate list 1120 after adding the first AMVP-derived candidate 1122 to candidate list 1120, the video coder does not add the second AMVP-derived candidate 1130 to candidate list 1120. If the current block is bi-directionally predicted, the video coder may repeat the process described above for generating candidate list 1120 with respect to List Y, where Y is equal to 1−X.

In some examples, motion vector prediction from the blocks other than the neighboring blocks used for MVP derivation in HEVC may be added to the candidate list. In some examples, a video coder updates a global MVP for affine motion on-the-fly and the video coder uses the global MVP for affine motion when the size of the candidate list is smaller than 2. For instance, a video coder may construct a global affine motion model using the available affine blocks and may update the global affine motion model whenever the video coder reconstructs an affine block. The video coder may then use this global affine motion model to generate a global MVP for the following affine blocks.

In HEVC and JEM3.0, a flag in the slice header, mvd_l1_zero_flag, indicates whether the MVD for the second reference picture list (e.g., List1) is equal to zero and therefore not signaled in the bitstream to further improve the coding efficiency. In other words, a single flag in a slice header of a slice may indicate that all List1 MVDs for all blocks of the slice are equal to 0. Using this flag may increase coding efficiency by eliminating the need to separately signal List1 MVDs equal to 0 for each AMVP or AF INTRA coded block of the slice.

However, in accordance with a technique of this disclosure, mvd_l1_zero_flag may be applicable to certain coding modes and for other modes, this flag is ignored even if the flag indicates the MVD is equal to zero. In one example, this zero MVD design is disabled for affine motion mode but this zero MVD design is still kept for the conventional inter mode (AMVP mode). In other words, even if the mvd_l1_zero_flag of a slice indicates that all List1 MVDs in the slice are equal to 0, video encoder 20 may still signal List1 MVDs for blocks of the slice that are encoded using an affine motion mode. By still being able to signal List1 MVDs for blocks that are encoded using an affine motion mode despite mvd_l1_zero_flag indicating List1 MVDs are equal to 0, video encoder 20 may be able to avoid signaling List1 MVDs for blocks that are not encoded using the affine motion mode while still being able to signal List1 MVDs for blocks that are encoded using the affine motion mode. This may result in increased coding efficiency. This disclosure describes example operations in accordance with this example technique below with reference to FIG. 19A and FIG. 19B.

Figure 12:
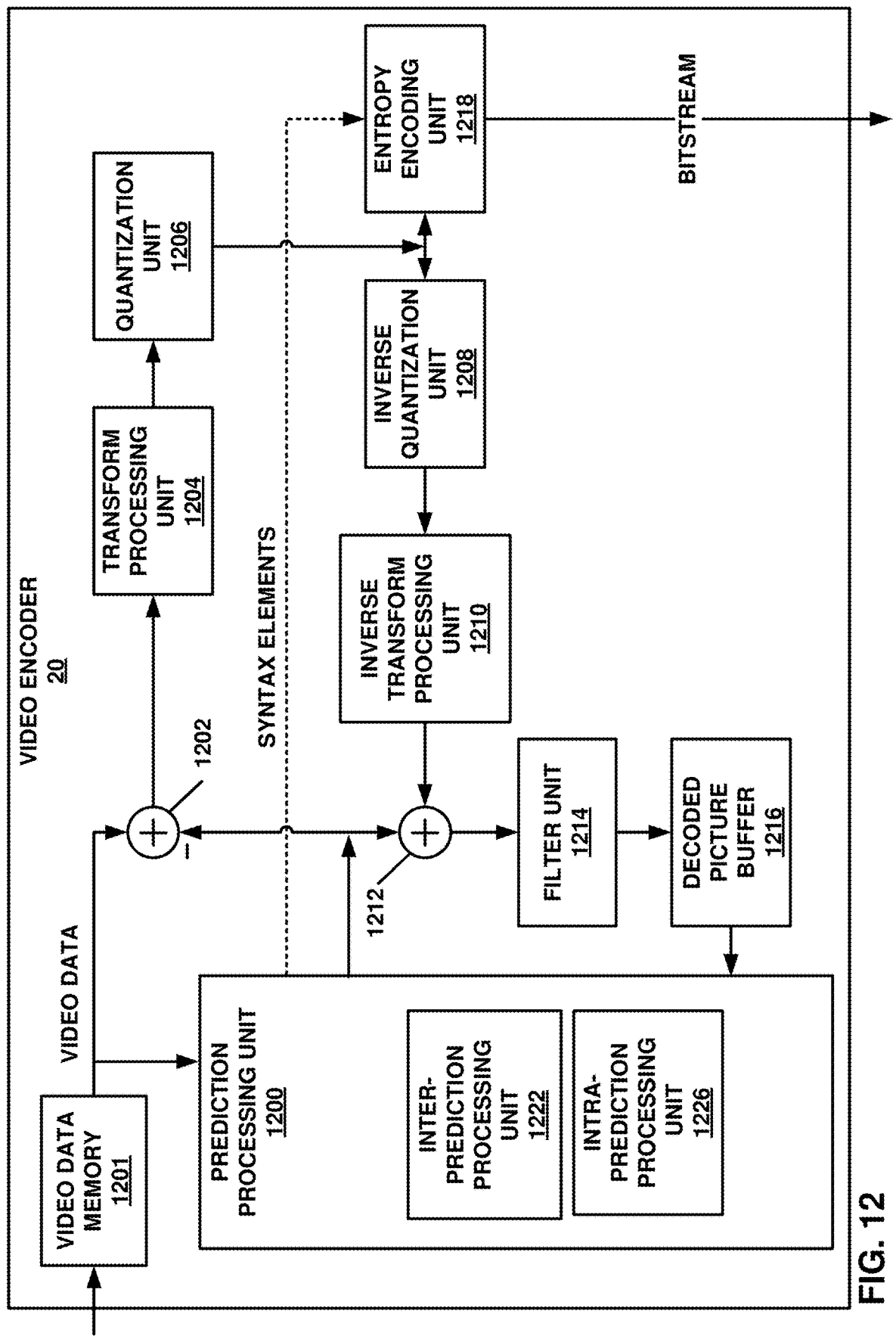
FIG. 12 is a block diagram illustrating an example video encoder that may implement one or more techniques described in this disclosure.

FIG. 12 is a block diagram illustrating an example video encoder 20 that may implement the techniques of this disclosure. FIG. 12 is provided for purposes of explanation and should not be considered limiting of the techniques as broadly exemplified and described in this disclosure. The techniques of this disclosure may be applicable to various coding standards or methods.

In the example of FIG. 12, video encoder 20 includes a prediction processing unit 1200, video data memory 1201, a residual generation unit 1202, a transform processing unit 1204, a quantization unit 1206, an inverse quantization unit 1208, an inverse transform processing unit 1210, a reconstruction unit 1212, a filter unit 1214, a decoded picture buffer 1216, and an entropy encoding unit 1218. Prediction processing unit 1200 includes an inter-prediction processing unit 1220 and an intra-prediction processing unit 1222. Inter-prediction processing unit 1220 may include a motion estimation unit and a motion compensation unit (not shown).

Video data memory 1201 may be configured to store video data to be encoded by the components of video encoder 20. The video data stored in video data memory 1201 may be obtained, for example, from video source 18. Decoded picture buffer 1216 may be a reference picture memory that stores reference video data for use in encoding video data by video encoder 20, e.g., in intra- or inter-coding modes. Video data memory 1201 and decoded picture buffer 1216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1201 and decoded picture buffer 1216 may be provided by the same memory device or separate memory devices. In various examples, video data memory 1201 may be on-chip with other components of video encoder 20, or off-chip relative to those components. Video data memory 1201 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 1200 may perform partitioning to divide the CTBs of the CTU into progressively-smaller blocks. The smaller blocks may be coding blocks of CUs. For example, prediction processing unit 1200 may partition a CTB associated with a CTU according to a tree structure.

Video encoder 20 may encode CUs of a CTU to generate encoded representations of the CUs (i.e., coded CUs). As part of encoding a CU, prediction processing unit 1200 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 1220 may generate predictive data for a PU. As part of generating the predictive data for a PU, inter-prediction processing unit 1220 performs inter prediction on the PU. The predictive data for the PU may include predictive blocks of the PU and motion information for the PU. Inter-prediction processing unit 1220 may perform different operations for a PU of a CU depending on whether the PU is in an I slice, a P slice, or a B slice. In an I slice, all PUs are intra predicted. Hence, if the PU is in an I slice, inter-prediction processing unit 1220 does not perform inter prediction on the PU. Thus, for blocks encoded in I-mode, the predicted block is formed using spatial prediction from previously-encoded neighboring blocks within the same frame. If a PU is in a P slice, inter-prediction processing unit 1220 may use uni-directional inter prediction to generate a predictive block of the PU. If a PU is in a B slice, inter-prediction processing unit 1220 may use uni-directional or bi-directional inter prediction to generate a predictive block of the PU.

Inter-prediction processing unit 1220 may apply the techniques for affine motion models as described elsewhere in this disclosure. For example, inter-prediction processing unit 1220 may select a source affine block, where the source affine block being an affine-coded block that spatially neighbors a current block. In this example, inter-prediction processing unit 1220 may extrapolate motion vectors of control points of the source affine block to determine motion vector predictors for control points of the current block. Furthermore, in this example, inter-prediction processing unit 1220 may insert, into an affine MVP set candidate list, an affine MVP set that includes the motion vector predictors for the control points of the current block. In this example, inter-prediction processing unit 1220 may select an affine MVP set in the affine MVP set candidate list. Additionally, in this example, inter-prediction processing unit 1220 may signal, in a bitstream, MVDs that indicate differences between motion vectors of the control points of the current block and motion vector predictors in the selected affine MVP set. Inter-prediction processing unit 1220 may also signal, in the bitstream, an index indicating a position in the affine MVP set candidate list of the selected affine MVP set.

Intra-prediction processing unit 1222 may generate predictive data for a PU by performing intra prediction on the PU. The predictive data for the PU may include predictive blocks of the PU and various syntax elements. Intra-prediction processing unit 1222 may perform intra prediction on PUs in I slices, P slices, and B slices.

To perform intra prediction on a PU, intra-prediction processing unit 1222 may use multiple intra prediction modes to generate multiple sets of predictive data for the PU. Intra-prediction processing unit 1222 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 1222 may use various numbers of intra prediction modes, e.g., 33 directional intra prediction modes. In some examples, the number of intra prediction modes may depend on the size of the region associated with the PU.

Prediction processing unit 1200 may select the predictive data for PUs of a CU from among the predictive data generated by inter-prediction processing unit 1220 for the PUs or the predictive data generated by intra-prediction processing unit 1222 for the PUs. In some examples, prediction processing unit 1200 selects the predictive data for the PUs of the CU based on rate/distortion metrics of the sets of predictive data. The predictive blocks of the selected predictive data may be referred to herein as the selected predictive blocks.

Residual generation unit 1202 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 1202 may generate the residual blocks of the CU such that each sample in the residual blocks has a value equal to a difference between a sample in a coding block of the CU and a corresponding sample in a corresponding selected predictive block of a PU of the CU.

Transform processing unit 1204 may perform partition the residual blocks of a CU into transform blocks of TUs of the CU. For instance, transform processing unit 1204 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 1204 may generate transform coefficient blocks for each TU of a CU by applying one or more transforms to the transform blocks of the TU. Transform processing unit 1204 may apply various transforms to a transform block associated with a TU. For example, transform processing unit 1204 may apply a discrete cosine transform (DCT), a directional transform, or a conceptually-similar transform to a transform block. In some examples, transform processing unit 1204 does not apply transforms to a transform block. In such examples, the transform block may be treated as a transform coefficient block.

Quantization unit 1206 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 1206 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 1208 and inverse transform processing unit 1210 may apply inverse quantization and inverse transforms to a coefficient block, respectively, to reconstruct a residual block from the coefficient block. Reconstruction unit 1212 may add the reconstructed residual block to corresponding samples from one or more predictive blocks generated by prediction processing unit 1200 to produce a reconstructed transform block associated with a TU. By reconstructing transform blocks for each TU of a CU in this way, video encoder 20 may reconstruct the coding blocks of the CU.

Filter unit 1214 may perform one or more deblocking operations to reduce blocking artifacts in the coding blocks associated with a CU. Decoded picture buffer 1216 may store the reconstructed coding blocks after filter unit 1214 performs the one or more deblocking operations on the reconstructed coding blocks. Inter-prediction processing unit 1220 may use a reference picture that contains the reconstructed coding blocks to perform inter prediction on PUs of other pictures. In addition, intra-prediction processing unit 1222 may use reconstructed coding blocks in decoded picture buffer 1216 to perform intra prediction on other PUs in the same picture as the CU.

Entropy encoding unit 1218 may receive data from other functional components of video encoder 20. For example, entropy encoding unit 1218 may receive coefficient blocks from quantization unit 1206 and may receive syntax elements from prediction processing unit 1200. Entropy encoding unit 1218 may perform one or more entropy encoding operations on the data to generate entropy-encoded data. For example, entropy encoding unit 1218 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 1218. For instance, the bitstream may include data that represents values of transform coefficients for a CU.

Figure 13:
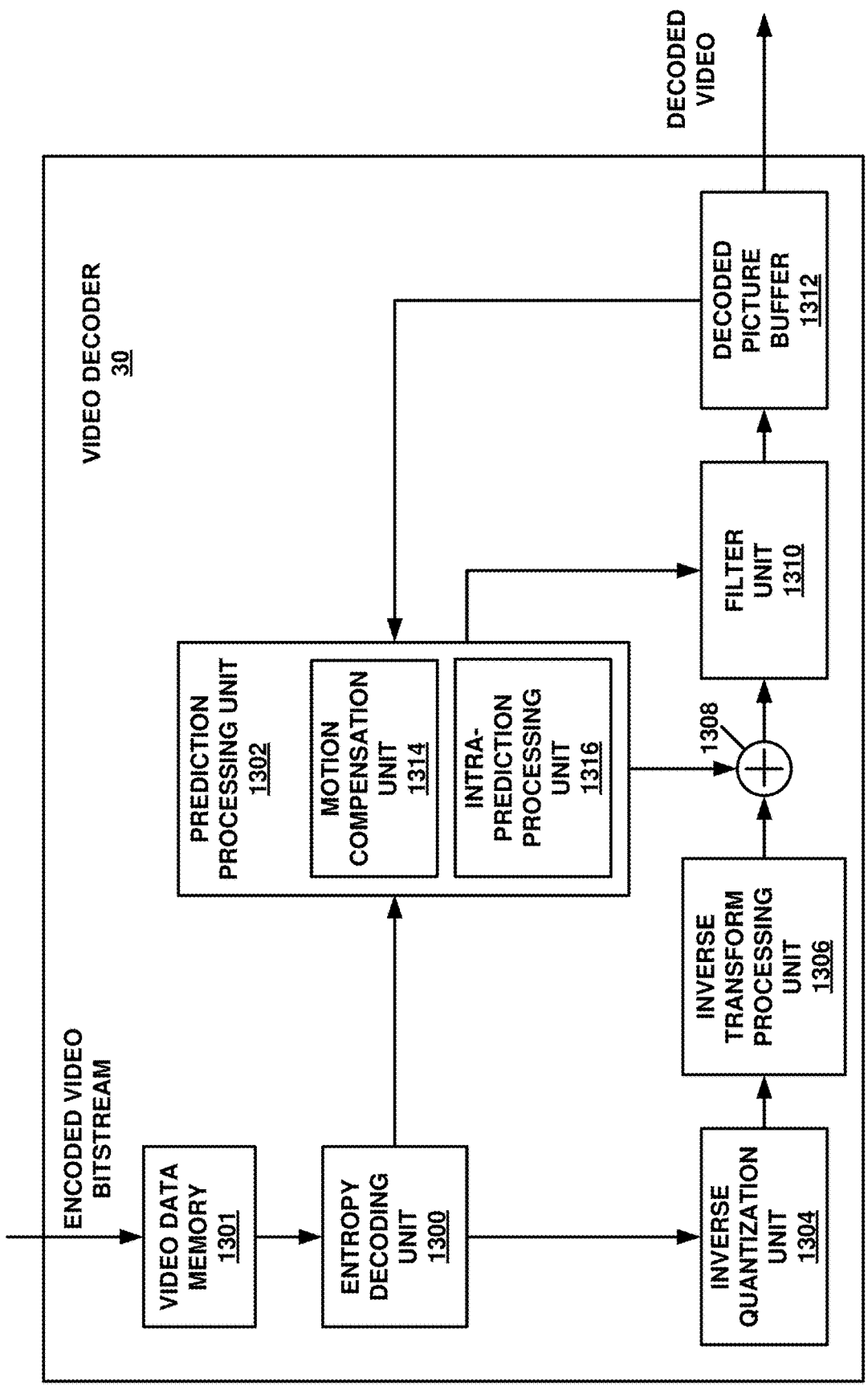
FIG. 13 is a block diagram illustrating an example video decoder that may implement one or more techniques described in this disclosure.

FIG. 13 is a block diagram illustrating an example video decoder 30 that is configured to implement the techniques of this disclosure. FIG. 13 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 13, video decoder 30 includes an entropy decoding unit 1300, video data memory 1301, a prediction processing unit 1302, an inverse quantization unit 1304, an inverse transform processing unit 1306, a reconstruction unit 1308, a filter unit 1310, and a decoded picture buffer 1312. Prediction processing unit 1302 includes a motion compensation unit 1314 and an intra-prediction processing unit 1316. In other examples, video decoder 30 may include more, fewer, or different functional components.

Video data memory 1301 may store encoded video data, such as an encoded video bitstream, to be decoded by the components of video decoder 30. The video data stored in video data memory 1301 may be obtained, for example, from computer-readable medium 16, e.g., from a local video source, such as a camera, via wired or wireless network communication of video data, or by accessing physical data storage media. Video data memory 1301 may form a coded picture buffer (CPB) that stores encoded video data from an encoded video bitstream. Decoded picture buffer 1312 may be a reference picture memory that stores reference video data for use in decoding video data by video decoder 30, e.g., in intra- or inter-coding modes, or for output. Video data memory 1301 and decoded picture buffer 1312 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1301 and decoded picture buffer 1312 may be provided by the same memory device or separate memory devices. In various examples, video data memory 1301 may be on-chip with other components of video decoder 30, or off-chip relative to those components. Video data memory 1301 may be the same as or part of storage media 28 of FIG. 1.

Video data memory 1301 receives and stores encoded video data (e.g., NAL units) of a bitstream. Entropy decoding unit 1300 may receive encoded video data (e.g., NAL units) from video data memory 1301 and may parse the NAL units to obtain syntax elements. Entropy decoding unit 1300 may entropy decode entropy-encoded syntax elements in the NAL units. Prediction processing unit 1302, inverse quantization unit 1304, inverse transform processing unit 1306, reconstruction unit 1308, and filter unit 1310 may generate decoded video data based on the syntax elements extracted from the bitstream. Entropy decoding unit 1300 may perform a process generally reciprocal to that of entropy encoding unit 1218.

In addition to obtaining syntax elements from the bitstream, video decoder 30 may perform a reconstruction operation on a CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 1304 may inverse quantize, i.e., de-quantize, coefficient blocks associated with the TU. After inverse quantization unit 1304 inverse quantizes a coefficient block, inverse transform processing unit 1306 may apply one or more inverse transforms to the coefficient block in order to generate a residual block associated with the TU. For example, inverse transform processing unit 1306 may apply an inverse DCT, an inverse integer transform, an inverse Karhunen-Loeve transform (KLT), an inverse rotational transform, an inverse directional transform, or another inverse transform to the coefficient block.

Inverse quantization unit 1304 may perform particular techniques of this disclosure. For example, for at least one respective quantization group of a plurality of quantization groups within a CTB of a CTU of a picture of the video data, inverse quantization unit 1304 may derive, based at least in part on local quantization information signaled in the bitstream, a respective quantization parameter for the respective quantization group. Additionally, in this example, inverse quantization unit 1304 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 1306, reconstruction unit 1308, and filter unit 1310) may reconstruct, based on inverse quantized transform coefficients of the transform block, a coding block of the CU.

If a PU is encoded using intra prediction, intra-prediction processing unit 1316 may perform intra prediction to generate predictive blocks of the PU. Intra-prediction processing unit 1316 may use an intra prediction mode to generate the predictive blocks of the PU based on samples spatially-neighboring blocks. Intra-prediction processing unit 1316 may determine the intra prediction mode for the PU based on one or more syntax elements obtained from the bitstream.

If a PU is encoded using inter prediction, motion compensation unit 1314 may determine motion information for the PU. Motion compensation unit 1314 may determine, based on the motion information of the PU, one or more reference blocks. Motion compensation unit 1314 may generate, based on the one or more reference blocks, predictive blocks (e.g., predictive luma, Cb and Cr blocks) for the PU.

Motion compensation unit 1314 may apply the techniques for affine motion models as described elsewhere in this disclosure. For example, motion compensation unit 1314 may select a source affine block, where the source affine block is an affine-coded block that spatially neighbors a current block. In this example, motion compensation unit 1314 may extrapolate motion vectors of control points of the source affine block to determine motion vector predictors for control points of the current block. In this example, motion compensation unit 1314 inserts, into an affine MVP set candidate list, an affine MVP set that includes the motion vector predictors for the control points of the current block. Furthermore, motion compensation unit 1314 determines, based on an index signaled in a bitstream, a selected affine MVP set in the affine MVP set candidate list. In this example, entropy decoding unit 1300 may obtain, from the bitstream, MVDs that indicate differences between motion vectors of the control points of the current block and motion vector predictors in the selected affine MVP set. Motion compensation unit 1314 may, in this example, determine, based on the motion vector predictors included in the selected affine MVP set and the MVDs, motion vectors of the control points of the current block. In this example, motion compensation unit 1314 may generate, based on the motion vectors of the control points of the current block, a predictive block.

Reconstruction unit 1308 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 1308 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 1310 may perform a deblocking operation to reduce blocking artifacts associated with the coding blocks of the CU. Video decoder 30 may store the coding blocks of the CU in decoded picture buffer 1312. Decoded picture buffer 1312 may provide reference pictures for subsequent motion compensation, intra prediction, and presentation on a display device, such as display device 32 of FIG. 1. For instance, video decoder 30 may perform, based on the blocks in decoded picture buffer 1312, intra prediction or inter prediction operations for PUs of other CUs.

Figures 14A, 14B:
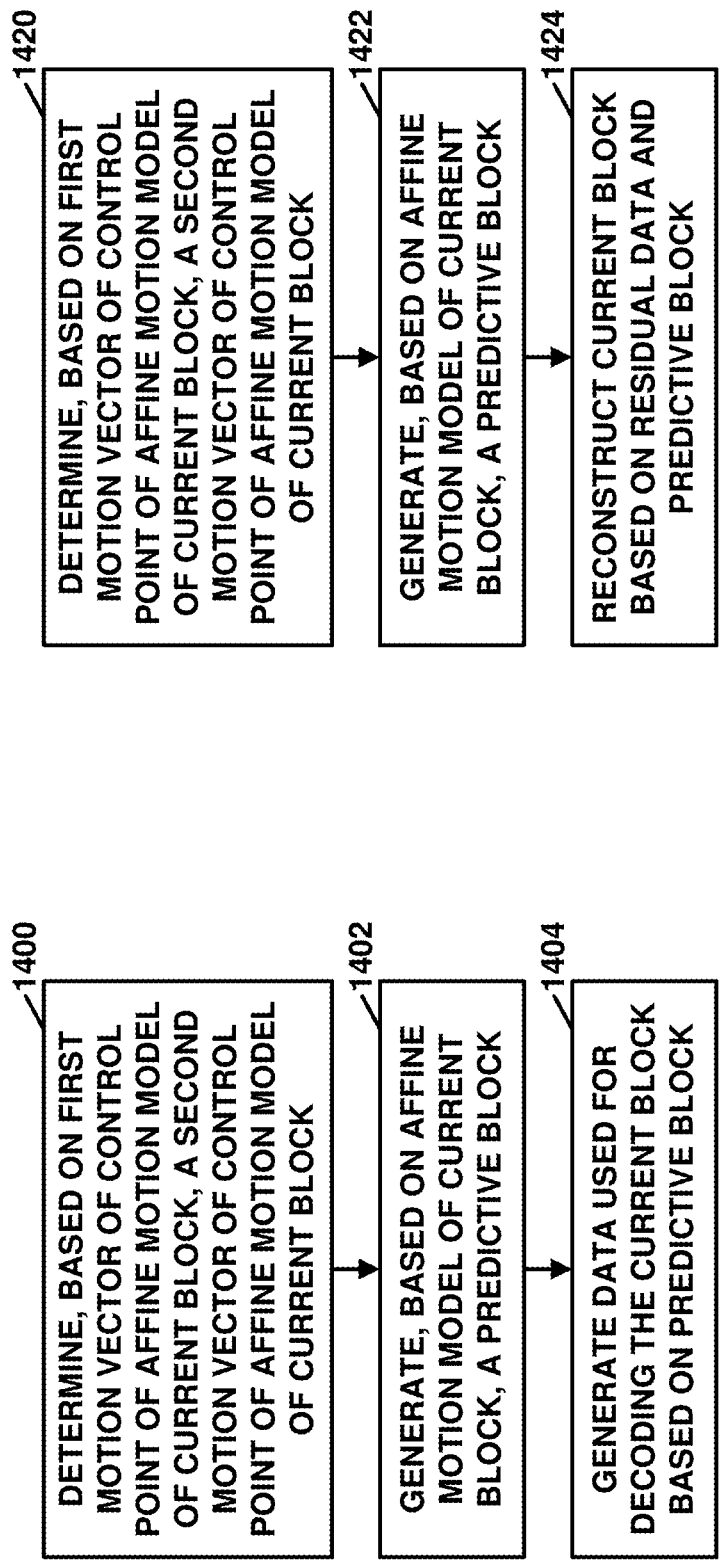
FIG. 14A is a flowchart illustrating an example operation for encoding video data, in accordance with a technique of this disclosure.
FIG. 14B is a flowchart illustrating an example operation for decoding video data, in accordance with a technique of this disclosure.

FIG. 14A is a flowchart illustrating an example operation for encoding video data, in accordance with a technique of this disclosure. The flowcharts of this disclosure are provided as examples. Other examples in accordance with techniques of this disclosure may include more, fewer, or different actions, or actions may be performed in different orders.

As described above, in accordance with one or more techniques of this disclosure, an affine motion model for one inter prediction direction may be used to improve the signaling of an affine motion model for another inter prediction direction. FIG. 14A and FIG. 14B show example operations in accordance with such techniques.

In the example of FIG. 14A, video encoder 20 determines, based on a first motion vector of a control point of an affine motion model of a current block of the video data, a second motion vector of the control point of the affine motion model of the current block (1400). The first motion vector corresponds to List X (where X is 0 or 1) and the second motion vector corresponds to List Y (where Y is 1−X). In one example for determining the second motion vector of the control point, video encoder 20 first determines the List X motion vector of the control point. Video encoder 20 may determine the List X motion vector of the control point in accordance with any of the examples provided in this disclosure. Furthermore, video encoder 20 may perform a search to determine a List Y motion vector for the control point that provides a best rate-distortion cost given the List X motion vector for the control point. In this example, video encoder 20 may signal a motion vector difference indicating a difference between the List X motion vector for the control point and the List Y motion vector for the control point.

In addition, video encoder 20 generates, based on the affine motion model of the current block, a predictive block (1402). Video encoder 20 may generate the predictive block in accordance with the examples provided elsewhere in this description. For example, video encoder 20 may use the List X and List Y motion vector of the control points of the affine motion model of the current block to determine List X and List Y motion vectors for sub-blocks of the current block, and may then apply motion compensation interpolation filters to generate predictive blocks for each of the sub-blocks, thereby generating the predictive block for the current block.

In the example of FIG. 14A, video encoder 20 also generates data used for decoding the current block based on the predictive block (1404). Video encoder 20 may generate the data used for decoding the current block in accordance with any of the examples provided elsewhere in this disclosure. For example, video encoder 20 may generate residual data, apply a transform to the residual data, quantize the transformed residual data, and apply entropy encoding to syntax elements representing the quantized transformed residual data, as described elsewhere in this disclosure.

FIG. 14B is a flowchart illustrating an example operation for decoding video data, in accordance with a technique of this disclosure. In the example of FIG. 14B, video decoder 30 determines, based on a first motion vector of a control point of an affine motion model of a current block of the video data, a second motion vector of the control point of the affine motion model of the current block (1420). The first motion vector corresponds to a first reference picture list (i.e., List X, where X is 0 or 1). The second motion vector corresponds to a second, different reference picture list (i.e., List Y, where Y is equal to 1−X). In this example, video decoder 30 may determine the List X motion vector for the control point in accordance with other examples provided in this disclosure. Furthermore, in this example, to determine the List Y motion vector for the control point, video decoder 30 may obtain, from the bitstream, a motion vector difference that indicates a difference between the List X motion vector for the control point and the List Y motion vector for the control point. In this example, video decoder 30 may add the motion vector difference to the List X motion vector of the control point to determine the List Y motion vector for the control point.

Additionally, video decoder 30 generates, based on the affine motion model of the current block, a predictive block (1422). Video decoder 30 may generate the predictive block in the same manner as video encoder 20 in FIG. 14A. Video decoder 30 may reconstruct the current block based on residual data and the predictive block (1424). For example, video decoder 30 may reconstruct the current block at least in part by adding samples of the residual data to corresponding samples of the predictive block.

Figures 15A, 15B:
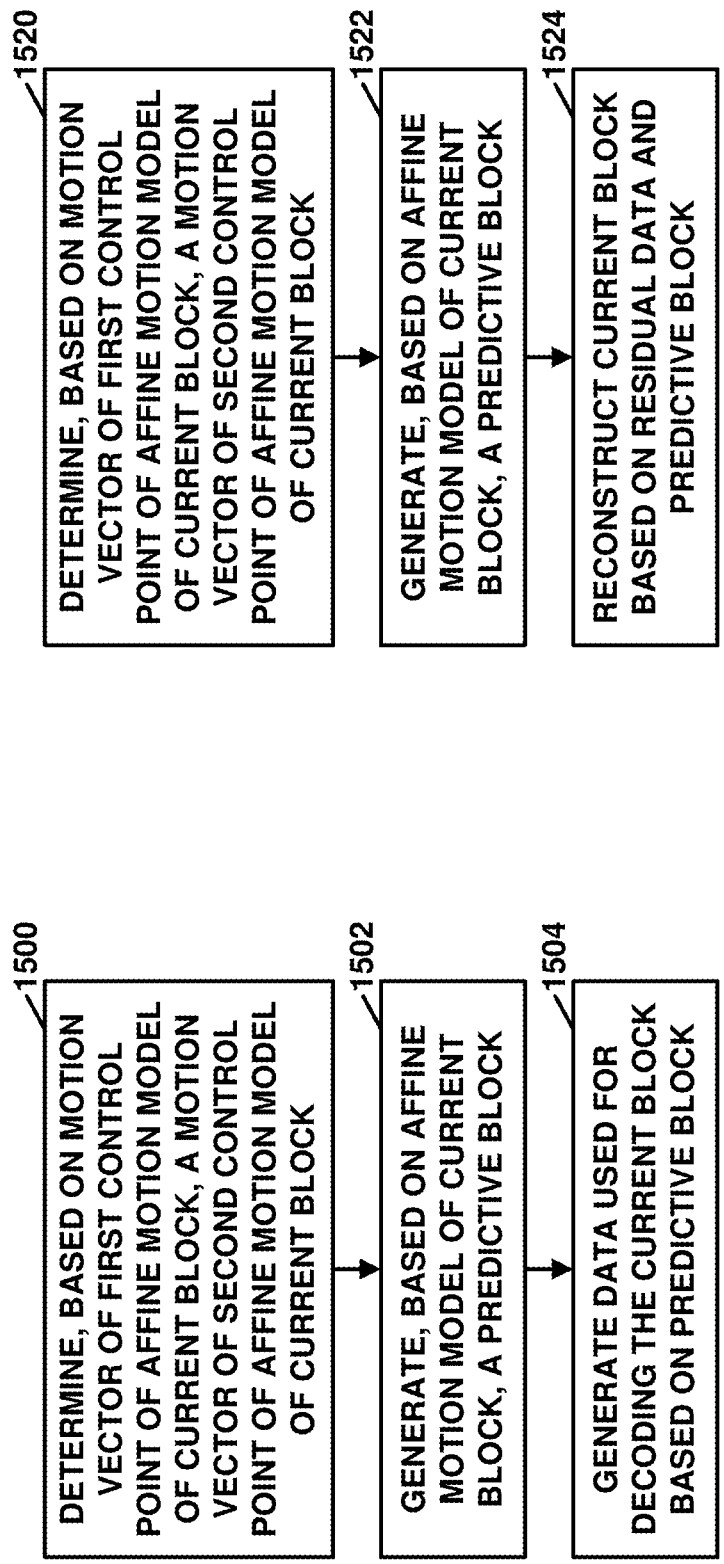
FIG. 15A is a flowchart illustrating an example operation for encoding video data, in accordance with a technique of this disclosure.
FIG. 15B is a flowchart illustrating an example operation for decoding video data, in accordance with a technique of this disclosure.

FIG. 15A is a flowchart illustrating an example operation for encoding video data, in accordance with a technique of this disclosure. As discussed above, in accordance with some techniques of this disclosure, the MVs of control points of a current block may be used as the MVP candidate for the MVs of other control points of the current block. FIG. 15A and FIG. 15B show example operations in accordance with these techniques.

In the example of FIG. 15A, video encoder 20 determines, based on a motion vector of a first control point of an affine motion model of a current block of the video data, a motion vector of a second control point of the affine motion model of the current block (1500). For example, video encoder 20 may include the motion vector of the first control point (e.g., a top-left control point) of the affine motion model of the current block as a candidate in a candidate list used for prediction of the motion vector of the second control point (e.g., a top-right control point) of the affine motion model of the current block. Other candidates in the candidate list may include motion vectors of corresponding control points (e.g., top-left control points) of neighboring affine-coded blocks. In this example, video encoder 20 may then select a candidate from the candidate list (e.g., based on rate-distortion cost). Furthermore, in this example, video encoder 20 may then use the motion vector of the selected candidate as the motion vector predictor for the second control point. In some examples, video encoder 20 signals an MVD indicating a difference between the motion vector of the selected candidate and the motion vector predictor for the second control point.

Furthermore, video encoder 20 generates, based on the affine motion model of the current block, a predictive block (1502). Additionally, video encoder 20 generates data used for decoding the current block based on the predictive block (1504). Video encoder 20 may generate the predictive block and generate the data used for decoding the current block in accordance with examples provided elsewhere in this disclosure.

FIG. 15B is a flowchart illustrating an example operation for decoding video data, in accordance with a technique of this disclosure. In the example of FIG. 15B, video decoder 30 determines, based on a motion vector of a first control point of an affine motion model of a current block of the video data, a motion vector of a second control point of the affine motion model of the current block (1520). Video decoder 30 may determine the motion vector of the second control point of the affine motion model of the current block in the same manner as described above with respect to video encoder 20 in FIG. 15A. To determine the motion vector of the second control point, video decoder 30 may obtain from a bitstream an index indicating a selected candidate in a candidate list. The candidate list may include motion vectors of control points, including a motion vector of the first control point of the current block. In some examples, video decoder 30 may determine the motion vector of the second control point by adding a signaled MVD to the motion vector of the selected candidate.

Additionally, video decoder 30 generates, based on the affine motion model of the current block, a predictive block (1522). Video decoder 30 reconstructs the block based on the predictive block (1524). Video decoder 30 may generate the predictive block and reconstruct the block in accordance with examples provided elsewhere in this disclosure. For instance, video decoder 30 may reconstruct the block based on the predictive block and decoded residual data.

FIG. 16A is a flowchart illustrating an example operation for encoding video data, in accordance with a technique of this disclosure. As discussed above, in accordance with some techniques of this disclosure, a video coder may use motion models of one or more neighboring affine blocks of a current block to predict a current affine motion model. In the example of FIG. 16A, video encoder 20 uses a motion model of a single neighboring affine block to predict at least two control points of an affine motion model for a current block (1600). In addition, video encoder 20 generates, based on the affine motion model of the current block, a predictive block (1602). Video encoder 20 then generates data used for decoding the current block based on the predictive block (1604). Video encoder 20 may generate the data in accordance with examples provided elsewhere in this disclosure.

FIG. 16B is a flowchart illustrating an example operation for decoding video data, in accordance with a technique of this disclosure. In the example of FIG. 16B, video decoder 30 uses a motion model of a single neighboring affine block to predict an affine motion model for a current block (1620). Furthermore, video decoder 30 generates, based on the affine motion model of the current block, a predictive block (1622). Video decoder 30 may then reconstruct the current block based on the predictive block (1624). Video decoder 30 may generate the predictive block and reconstruct the current block in accordance with any of the examples provided elsewhere in this disclosure.

Figure 17:
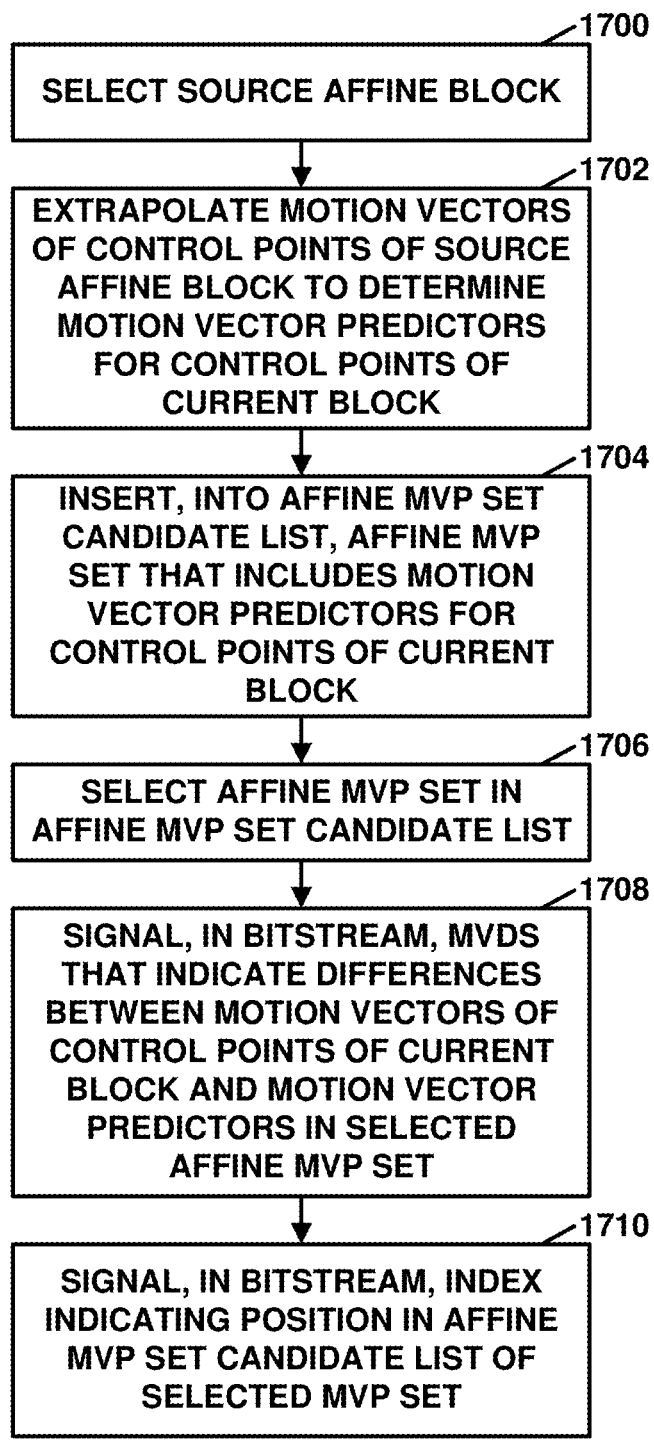
FIG. 17 is a flowchart illustrating an example operation for encoding video data, in accordance with a technique of this disclosure.
Figure 18:
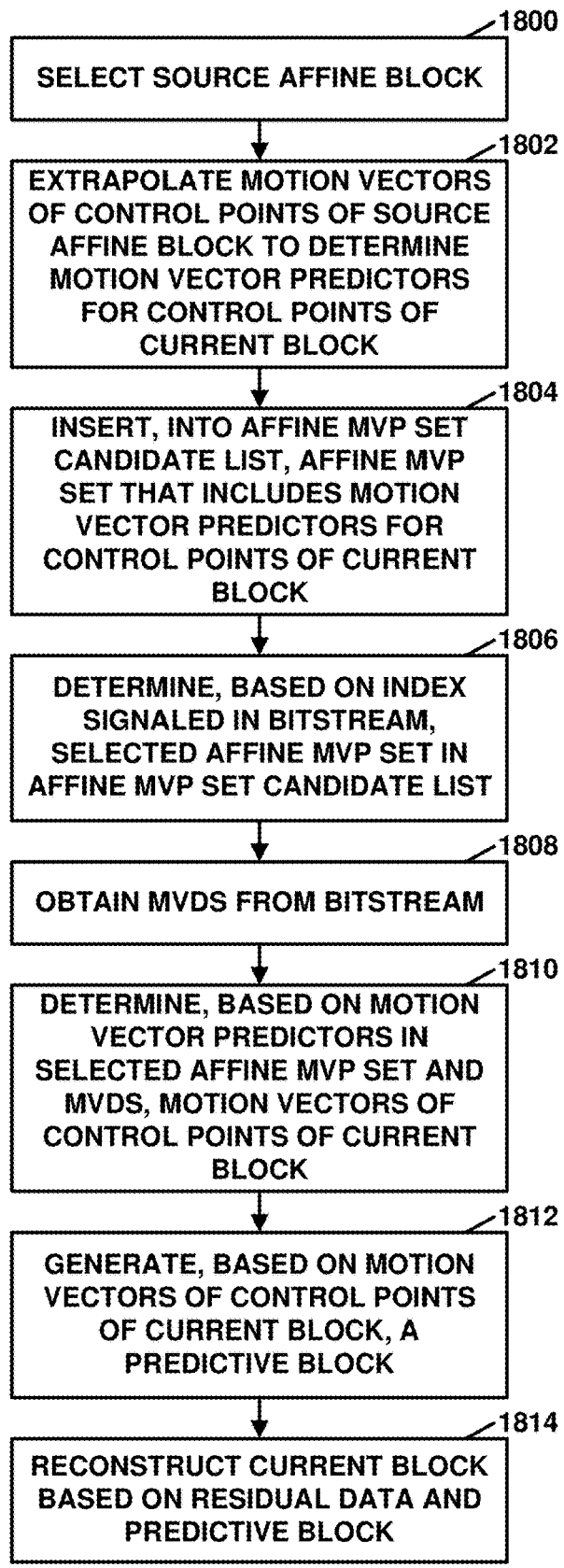
FIG. 18 is a flowchart illustrating an example operation for decoding video data, in accordance with a technique of this disclosure.

FIG. 17 is a flowchart illustrating an example operation for encoding video data, in accordance with a technique of this disclosure. FIG. 17 and FIG. 18 are more detailed flowcharts for the operations outlined in FIG. 16A and FIG. 16B. In the example of FIG. 17, video encoder 20 selects a source affine block (1700). The source affine block is an affine-coded block that spatially neighbors a current block. Video encoder 20 may select the source affine block in various ways. For example, video encoder 20 may determine that the source affine block is a first-occurring affine-coded block of the plurality of neighbor blocks visited in a predefined visiting order. In some examples, video encoder 20 may determine that the source affine block is a first-occurring available affine-coded block of the plurality of neighbor blocks according to a plurality of predefined priority sets based on a predefined visiting order. An affine-coded block is not considered available if the affine-coded block is not in one of the predefined priority sets. Various examples of priority sets are described elsewhere in this disclosure.

Additionally, video encoder 20 may extrapolate motion vectors of control points of the source affine block to determine motion vector predictors for control points of the current block (1702). For example, video encoder 20 may construct an affine motion model defined by the affine parameters determined by the motion vectors of the control points of the affine source block. Video encoder 20 may then derive the motion vectors of the control points of the current block (or so called extrapolated) using the constructed affine motion model. For instance, to extrapolate a motion vector of a control point of the current block, video encoder 20 may use the motion vectors of the constructed affine motion model and the (x, y) position of the control point of the current block in equation 2 to determine a motion vector of the control point.

Furthermore, video encoder 20 may insert, into an affine MVP set candidate list, an affine MVP set that includes the motion vector predictors for the control points of the current block (1704). In some examples, video encoder 20 may also include a conventional affine MVP set in the affine MVP set. For instance, in one example, video encoder 20 may determine a first motion vector predictor as a motion vector of a block adjacent to the first control point of the current block.

In this example, video encoder 20 determines a second motion vector predictor as a motion vector of a block adjacent to the second control point of the current block (e.g., blocks A, B, or C; or blocks D or E of FIG. 6A). In this example, video encoder 20 inserts, into the affine MVP set candidate list, an affine MVP set that includes the first motion vector predictor and the second motion vector predictor.

In some examples, video encoder 20 selects a second source affine block. The second source affine block is a different affine-coded block that spatially neighbors the current block. In this example, video encoder 20 extrapolates motion vectors of control points of the second source affine block to determine second motion vector predictors for the control points of the current block. Furthermore, video encoder 20 inserts a second affine MVP set into the affine MVP set candidate list. The second affine MVP set includes the second motion vector predictors for the control points of the current block.

Subsequently, video encoder 20 selects an affine MVP set in the affine MVP set candidate list (1706). Video encoder 20 may select the affine MVP set based on a rate-distortion analysis of the affine MVP sets in the affine MVP set candidate list.

Video encoder 20 may signal, in a bitstream, MVDs that indicate differences between motion vectors of the control points of the current block and motion vector predictors in the selected affine MVP set (1708). In addition, video encoder 20 may signal, in the bitstream, an index indicating a position in the affine MVP set candidate list of the selected affine MVP set (1710).

FIG. 18 is a flowchart illustrating an example operation for decoding video data, in accordance with a technique of this disclosure. In the example of FIG. 18, video decoder 30 selects a source affine block (1800). The source affine block is an affine-coded block that spatially neighbors a current block. Video decoder 30 may select the source affine block in the same way as video encoder 20, as described elsewhere in this disclosure.

Additionally, video decoder 30 extrapolates motion vectors of control points of the source affine block to determine motion vector predictors for control points of the current block (1802). Video decoder 30 inserts, into an affine MVP set candidate list, an affine MVP set that includes the motion vector predictors for the control points of the current block (1804). Video decoder 30 may extrapolate the motion vectors of the control points and insert the affine MVP set in the same way as video encoder 20, as described elsewhere in this disclosure. Video decoder 30 may also add the additional affine MVP sets into the affine MVP set candidate list as described above with respect to video encoder 20.

Furthermore, video decoder 30 determines, based on an index signaled in a bitstream, a selected affine MVP set in the affine MVP set candidate list (1806). Video decoder 30 obtains, from the bitstream, MVDs that indicate differences between motion vectors of the control points of the current block and motion vector predictors in the selected affine MVP set (1808). In addition, video decoder 30 determines, based on the motion vector predictors included in the selected affine MVP set and the MVDs, motion vectors of the control points of the current block (1810). For example, video decoder 30 may add the MVDs to corresponding motion vector predictors to determine the motion vectors of the control points of the current block.

Video decoder 30 may then generate, based on the motion vectors of the control points of the current block, a predictive block (1812). Video decoder 30 may reconstruct the current block based on residual data and the predictive block (1814). Video decoder 30 may generate the predictive block and reconstruct the current block in accordance with examples provided elsewhere in this disclosure.

Figures 19A, 19B:
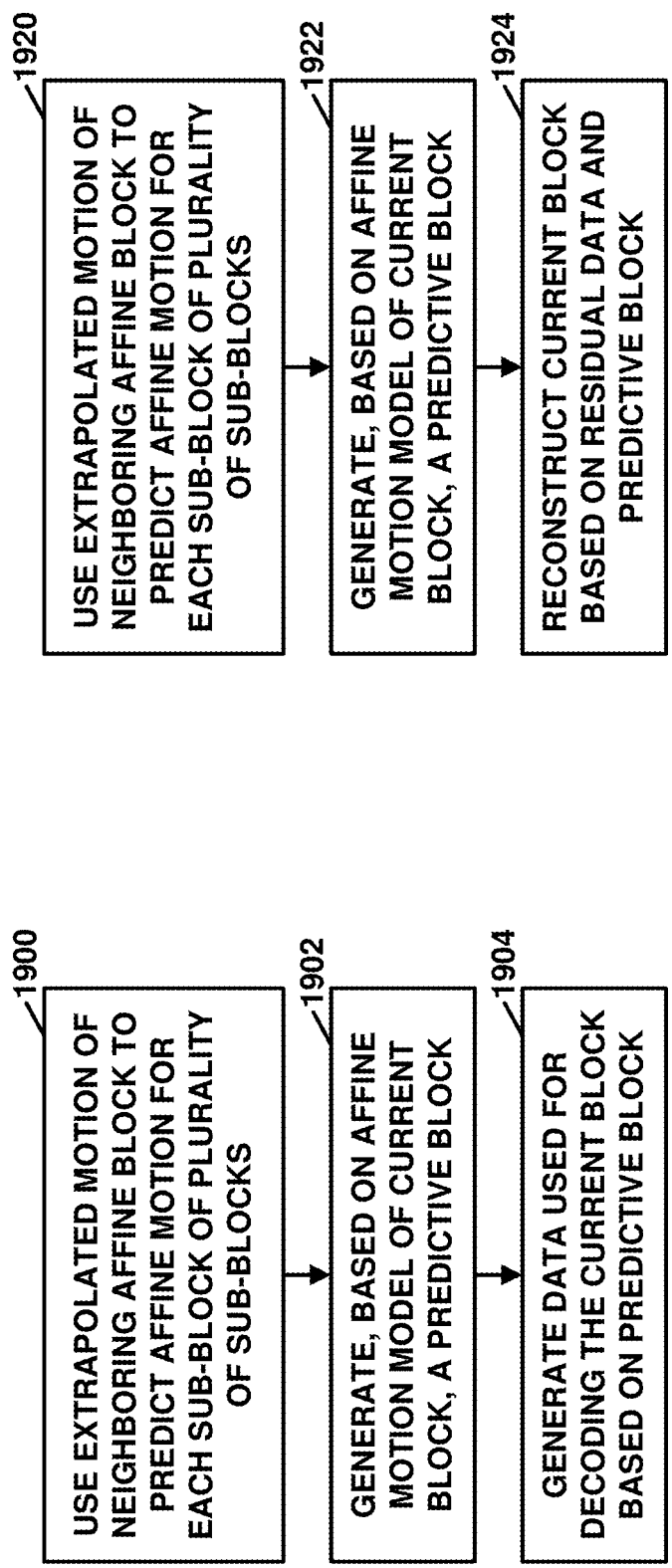
FIG. 19A is a flowchart illustrating an example operation for encoding video data, in accordance with a technique of this disclosure.
FIG. 19B is a flowchart illustrating an example operation for decoding video data, in accordance with a technique of this disclosure.

FIG. 19A is a flowchart illustrating an example operation for encoding video data, in accordance with a technique of this disclosure. As discussed above, in accordance with some techniques of this disclosure, in affine inter mode or affine merge mode, the affine parameters of each sub-block (e.g. 4×4 block) of a current block can be predicted or directly inherited from the sub-block's own neighbor blocks. FIG. 19A and FIG. 19B show example operations in accordance with such techniques.

In the example of FIG. 19A, a current block of the video data is partitioned into a plurality of sub-blocks. For each respective sub-block of the plurality of sub-blocks, video encoder 20 uses extrapolated motion of a respective neighboring affine block to predict affine motion for the respective sub-block (1900). Video encoder 20 may extrapolate the motion of the respective neighboring affine block in the same way as described elsewhere in this disclosure. In some examples, to use the extrapolated motion of the respective neighboring affine block to predict the affine motion for the respective sub-block, video encoder 20 predicts the affine motion for the respective sub-block from the extrapolated motion of the neighboring affine block. In some instances, the neighboring affine block is another sub-block of the current block. In some examples, to use the extrapolated motion of the respective neighboring affine block, video encoder 20 inherits the affine motion for each respective sub-block directly from the extrapolated motion of the neighboring affine block. In other words, video encoder 20 sets the reference indexes and motion vectors of the control points of the respective sub-block equal to the motion indexes and extrapolated motion vectors of the control points of the respective neighboring affine block. For instance, as shown in FIG. 10, sub-block 1002 may inherit the reference indexes and extrapolated motion vectors of control points of affine block 1004.

Additionally, video encoder 20 generates, based on the affine motion for the sub-blocks, a predictive block (1902). For example, for each respective sub-block of the plurality of sub-blocks, video encoder 20 may use the affine motion for the respective sub-block to generate a respective predictive sub-block for the respective sub-block. In this example, video encoder 20 may use the affine motion for the respective sub-block to generate the respective predictive sub-block for the respective sub-block in the same manner described elsewhere in this disclosure for using affine motion to generate a predictive block. For instance, video encoder 20 may use equation (2) to calculate the x-component and y-component of a motion vector for the respective sub-block. Video encoder 20 may then use the motion vector for the respective sub-block to determine a preliminary or final predictive block for the respective sub-block. Furthermore, in this example, video encoder 20 may combine the predictive sub-blocks to generate the predictive block for the current block.

Video encoder 20 generates data used for decoding the current block based on the predictive block (1904). Video encoder 20 may generate the data used for decoding the current block in accordance with any of the corresponding examples provided elsewhere in this disclosure.

FIG. 19B is a flowchart illustrating an example operation for decoding video data, in accordance with a technique of this disclosure. In the example of FIG. 16B, a current block of the video data is partitioned into the plurality of sub-blocks. For each respective sub-block of the plurality of sub-blocks, video decoder 30 uses extrapolated motion of a respective neighboring affine block to predict affine motion for the respective sub-block (1920). Video decoder 30 may predict the affine motion for the respective sub-block in the same manner as described above with respect to video encoder 20. In some examples, to use the extrapolated motion of the respective neighboring affine block, video decoder 30 predicts the affine motion for each respective sub-block from the extrapolated motion of the neighboring affine block. In some examples, to use the extrapolated motion of the respective neighboring affine block, video decoder 30 inherits the affine motion for each respective sub-block directly from the extrapolated motion of the neighboring affine block.

Furthermore, video decoder 30 generates, based on the affine motion of the sub-blocks, a predictive block (1922). Video decoder 30 may generate the predictive block in the same manner as described above with respect to video encoder 20. Video decoder 30 reconstructs the block based on the predictive block (1924). For example, video decoder 30 may reconstruct the current block may adding samples of the predictive block to corresponding residual samples decoded from a bitstream.

FIG. 20A is a flowchart illustrating an example operation for encoding video data, in accordance with a technique of this disclosure. As discussed above, in accordance with some techniques of this disclosure, offsets may be added to the MVPs to make sure not all the MVPs within one MVP candidate set are identical. FIG. 20A and FIG. 20B show example operations in accordance with these techniques.

Particularly, in the example of FIG. 20A, a first motion vector is a motion vector of a first control point of an affine motion model of a current block. A second motion vector is a motion vector of a second control point of the affine motion model of the current block. Based on a total number of candidates in a candidate list of motion vectors being less than 2 and the first motion vector and the second motion vector being the same, video encoder 20 adds an offset to a motion vector predictor (2000). As described elsewhere in this disclosure, the offset may be different for different positions in the candidate list.

In addition, video encoder 20 includes the motion vector predictor in the candidate list (2002). For example, video encoder 20 may include the motion vector predictor in an array of motion vector predictors. Additionally, video encoder 20 selects a candidate in the candidate list (2004). Video encoder 20 may select the candidate such that the selected candidate results in the best rate-distortion value among the candidates in the candidate list. Furthermore, video encoder 20 uses the selected candidate to determine a predictive block (2006). For example, video encoder 20 may use the motion vectors specified by the selected candidate to identify locations in a reference picture. In this example, video encoder 20 may determine the predictive block by applying a rotation to a copy of a block of samples at the identified locations in the reference picture. In some examples, video encoder 20 may use the selected candidate to determine a first preliminary predictive block, and also determine a second predictive block (e.g., based on samples in a reference picture in a different reference picture list). In this example, video encoder 20 may determine samples in the predictive block as weighted averages of corresponding samples in the first preliminary predictive block and the second preliminary predictive block.

Video encoder 20 may then generate residual data based on samples of the current block and the predictive block (2008). For example, video encoder 20 may generate the residual data such that each sample of the residual data indicates a difference between corresponding samples in the current block and the predictive block. Additionally, video encoder 20 includes, in a bitstream that comprises an encoded representation of the video data, an indication of a selected candidate in the candidate list (2010).

FIG. 20B is a flowchart illustrating an example operation for decoding video data, in accordance with a technique of this disclosure. In the example of FIG. 18B, based on a total number of candidates in a candidate list of motion vectors being less than 2 and a first motion vector and a second motion vector being the same, video decoder 30 adds an offset to a motion vector predictor (2020). In this example, the first motion vector is a motion vector of a first control point of an affine motion model of a current block of the video data. The second motion vector is a motion vector of a second control point of the affine motion model of the current block.

Furthermore, in the example of FIG. 20B, video decoder 30 includes the motion vector predictor in the candidate list (2022). Video decoder 30 may then determine a selected candidate in the candidate list (2024). Additionally, video decoder 30 may use the selected candidate to determine a predictive block (2026). Video decoder 30 may then reconstruct the current block based on the predictive block (2028). In some examples, video decoder 30 may reconstruct the current block based on the predictive block and residual data.

FIG. 21A is a flowchart illustrating an example operation for encoding video data, in accordance with a technique of this disclosure. As noted above, in accordance with a technique of this disclosure, the mvd_l1_zero_flag may be applicable to certain coding modes and for other modes, this flag is ignored even if the mvd_l1_zero_flag indicates the MVD is equal to zero. FIG. 21A and FIG. 21B show example operations in accordance with this technique.

Specifically, in the example of FIG. 21A, video encoder 20 includes, in a bitstream, a flag (e.g., mvd_l1_zero_flag) that indicates whether motion vector differences for second reference pictures lists (e.g., list 1) are signaled in the bitstream (2100). Based on motion of a current block of the video data being an affine motion mode, regardless of the value of the flag, video encoder 20 includes in the bitstream a MVD (2102). For example, video encoder 20 may include in the bitstream a syntax element indicating a vertical component of the MVD and a second element indicating a horizontal component of the MVD.

Furthermore, video encoder 20 generates, based on the affine motion model of the current block, a predictive block (2104). Video encoder 20 may generate the predictive block based on the affine motion model of the current block in accordance with any of the examples provided elsewhere in this disclosure. Video encoder 20 may then generate data used for decoding the current block based on the predictive block (2106). For example, video encoder 20 may generate residual data, apply a transform to the residual data, quantized the transformed residual data, and apply entropy encoding to syntax elements representing the quantized transformed residual data, as described elsewhere in this disclosure.

FIG. 21B is a flowchart illustrating an example operation for decoding video data, in accordance with a technique of this disclosure. In the example of FIG. 21B, video decoder 30 obtains, from a bitstream, a flag (e.g., mvd_l1_zero_flag)

that indicates whether motion vector differences for second reference pictures lists (e.g., list 1) are signaled in the bitstream (2120).

Additionally, in the example of FIG. 21B, based on motion of a current block of the video data being an affine motion mode, regardless of the value of the flag, video decoder 30 obtains from the bitstream a MVD (2122). In other words, video decoder 30 decodes the MVD from the bitstream. In some examples, to obtain the MVD from the bitstream, video decoder 30 obtains from the bitstream a first syntax element indicating a vertical component of the MVD and a second syntax element indicating a horizontal component of the MVD. Video decoder 30 determines, based on the motion vector difference, an affine motion model for the current block (2124). Additionally, video decoder 30 generates, based on the affine motion model of the current block, a predictive block (2126). Furthermore, video decoder 30 reconstructs the block based the predictive block (2128). Video decoder 30 may generate the predictive block and reconstruct the block in accordance with any of the examples provided elsewhere in this disclosure.

Certain aspects of this disclosure have been described with respect to extensions of the HEVC standard for purposes of illustration. However, the techniques described in this disclosure may be useful for other video coding processes, including other standard or proprietary video coding processes presently under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding video data, the device comprising:
   a memory; and
   a processor, connected to the memory, configured to:
      determine motion vectors of a first control point and a second control point corresponding to a 4-parameter affine transform model, of a current block of the video data;
      derive, using the motion vectors of the first control point and the second control point, motion vectors predictors for a third control point for a 6-parameter affine transform model;
      insert, into an affine motion vector predictor (MVP) set candidate list, the motion vector predictors for the third control point;
      determine, based on an index signaled in a bitstream, a selected affine MVP set in the affine MVP set candidate list;
      determine, based on motion vector predictors included in the selected affine MVP set, motion vectors of the third control point of the current block;
      generate, based on the motion vectors of the first control point, the second control point, and the third control point of the current block, a predictive block; and
      reconstruct the current block based on residual data and the predictive block.

2. The device of claim 1, wherein the first control point is a top-left control point, the second control point is a top-right control point, and the third control point is a bottom-left control point.

3. The device of claim 1, wherein the first control point is a top-left control point, the second control point is a bottom-left control point, and the third control point is a top-right control point.

4. The device of claim 1, wherein the processor is further configured to:
   obtain, from the bitstream, motion vector differences (MVDs) that indicate differences between motion vectors of the third control point of the current block and motion vector predictors in the selected affine MVP set; and
   further determine the motion vectors of the third control point based on the MVDs.

5. The device of claim 1, wherein the processor is further configured to:
   determine a first motion vector predictor as a motion vector of a block adjacent to the first control point of the current block;
   determine a second motion vector predictor as a motion vector of a block adjacent to the second control point of the current block; and
   insert, into the affine MVP set candidate list, an affine MVP set that includes the first motion vector predictor and the second motion vector predictor.

6. The device of claim 5, wherein the processor is further configured to determine the motion vectors of the first control point and the second control point based on the first motion vector predictor and the second motion vector predictor.

7. The device of claim 1, wherein the device is a wireless communication device.

8. A method of decoding video data, the method comprising:
   determining motion vectors of a first control point and a second control point corresponding to a 4-parameter affine transform model, of a current block of the video data;
   deriving, using the motion vectors of the first control point and the second control point, motion vectors predictors for a third control point for a 6-parameter affine transform model;
   inserting, into an affine motion vector predictor (MVP) set candidate list, the motion vector predictors for the third control point;
   determining, based on an index signaled in a bitstream, a selected affine MVP set in the affine MVP set candidate list;
   determining, based on motion vector predictors included in the selected affine MVP set, motion vectors of the third control point of the current block;
   generating, based on the motion vectors of the first control point, the second control point, and the third control point of the current block, a predictive block; and
   reconstructing the current block based on residual data and the predictive block.

9. The method of claim 8, wherein the first control point is a top-left control point, the second control point is a top-right control point, and the third control point is a bottom-left control point.

10. The method of claim 8, wherein the first control point is a top-left control point, the second control point is a bottom-left control point, and the third control point is a top-right control point.

11. The method of claim 8, further comprising:
   obtaining, from the bitstream, motion vector differences (MVDs) that indicate differences between motion vectors of the third control point of the current block and motion vector predictors in the selected affine MVP set; and
   further determining the motion vectors of the third control point based on the MVDs.

12. The method of claim 8, further comprising:
   determining a first motion vector predictor as a motion vector of a block adjacent to the first control point of the current block;
   determining a second motion vector predictor as a motion vector of a block adjacent to the second control point of the current block; and
   inserting, into the affine MVP set candidate list, an affine MVP set that includes the first motion vector predictor and the second motion vector predictor.

13. The method of claim 12, further comprising determining the motion vectors of the first control point and the second control point based on the first motion vector predictor and the second motion vector predictor.

14. A non-transitory computer-readable medium for decoding video data, the non-transitory computer-readable medium storing instructions that, when executed, cause a processor to perform operations comprising:
   determining motion vectors of a first control point and a second control point corresponding to a 4-parameter affine transform model, of a current block of the video data;
   deriving, using the motion vectors of the first control point and the second control point, motion vectors predictors for a third control point for a 6-parameter affine transform model;

inserting, into an affine motion vector predictor (MVP) set candidate list, the motion vector predictors for the third control point;

determining, based on an index signaled in a bitstream, a selected affine MVP set in the affine MVP set candidate list;

determining, based on motion vector predictors included in the selected affine MVP set, motion vectors of the third control point of the current block;

generating, based on the motion vectors of the first control point, the second control point, and the third control point of the current block, a predictive block; and reconstructing the current block based on residual data and the predictive block.

15. The non-transitory computer-readable medium of claim 14, wherein the first control point is a top-left control point, the second control point is a top-right control point, and the third control point is a bottom-left control point.

16. The non-transitory computer-readable medium of claim 14, wherein the first control point is a top-left control point, the second control point is a bottom-left control point, and the third control point is a top-right control point.

17. The non-transitory computer-readable medium of claim 14, wherein the operations further comprise:

obtaining, from the bitstream, motion vector differences (MVDs) that indicate differences between motion vectors of the third control point of the current block and motion vector predictors in the selected affine MVP set; and further determining the motion vectors of the third control point based on the MVDs.

18. The non-transitory computer-readable medium of claim 14, wherein the operations further comprise:

determining a first motion vector predictor as a motion vector of a block adjacent to the first control point of the current block;

determining a second motion vector predictor as a motion vector of a block adjacent to the second control point of the current block; and inserting, into the affine MVP set candidate list, an affine MVP set that includes the first motion vector predictor and the second motion vector predictor.

19. The method of claim 18, wherein the operations further comprise determining the motion vectors of the first control point and the second control point based on the first motion vector predictor and the second motion vector predictor.

* * * * *